US006417239B1

(12) United States Patent
Murray et al.

(10) Patent No.: US 6,417,239 B1
(45) Date of Patent: Jul. 9, 2002

(54) METHODS OF MAKING MODIFIED CONDENSATION POLYMERS

(75) Inventors: David Logan Murray, Fall Branch; Allan Scott Jones, Limestone; Wesley R. Hale, Kingsport, all of TN (US); William R. Darnell, Weber City, VA (US); Douglas Weldon Carico, Jr.; Sara Stanley Wells, both of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/617,632

(22) Filed: Jul. 17, 2000

Related U.S. Application Data

(60) Division of application No. 09/262,156, filed on Mar. 3, 1999, which is a continuation-in-part of application No. 09/141,051, filed on Aug. 27, 1998, now abandoned, and a continuation-in-part of application No. 09/141,054, filed on Aug. 27, 1998, now abandoned.
(60) Provisional application No. 60/057,714, filed on Aug. 28, 1997, and provisional application No. 60/058,008, filed on Aug. 28, 1997.

(51) Int. Cl.[7] .............................. C08J 11/24; C08F 2/08; C08L 67/02; C08G 63/91
(52) U.S. Cl. ..................... 521/48.5; 521/48.5; 523/201; 524/604; 524/845; 528/274
(58) Field of Search .................. 521/48.5, 48; 523/201; 524/604, 845; 528/274

(56) References Cited

U.S. PATENT DOCUMENTS

| | | |
|---|---|---|
| 2,891,920 A | 6/1959 | Hyde et al. |
| 3,294,725 A | 12/1966 | Findlay et al. |
| 3,384,653 A | 5/1968 | Erner et al. |
| 3,394,164 A | 7/1968 | McClellan et al. |
| 3,642,964 A | 2/1972 | Rausch, Jr. et al. |
| 3,644,457 A | 2/1972 | König et al. |
| 3,779,969 A | 12/1973 | Slagel et al. |
| 3,883,571 A | 5/1975 | Allport et al. |
| 3,985,703 A | 10/1976 | Ferry et al. |
| 4,031,026 A | 6/1977 | Ibbotson |
| 4,115,429 A | 9/1978 | Reiff et al. |
| 4,118,411 A | 10/1978 | Reiff et al. |
| 4,163,002 A | 7/1979 | Pohl et al. |
| 4,177,177 A | 12/1979 | Vanderhoff et al. |
| 4,180,494 A | 12/1979 | Fromuth et al. |
| 4,202,957 A | 5/1980 | Bonk et al. |
| 4,204,049 A | 5/1980 | Matthies et al. |
| 4,259,478 A | 3/1981 | Jackson, Jr. et al. |
| 4,366,306 A | 12/1982 | Smith |
| 4,370,160 A | 1/1983 | Ziemelis |
| 4,376,834 A | 3/1983 | Goldwasser et al. |
| 4,393,153 A | 7/1983 | Hepp |
| 4,414,362 A | 11/1983 | Lenke et al. |
| 4,458,050 A | 7/1984 | Heyman |
| 4,474,918 A | 10/1984 | Seymour et al. |
| 4,495,324 A | 1/1985 | Chacko et al. |
| 4,567,236 A | 1/1986 | Goldwasser et al. |
| 4,568,616 A | 2/1986 | Seifried et al. |
| 4,578,437 A | 3/1986 | Light et al. |
| 4,618,642 A | 10/1986 | Schoenherr |
| 4,675,372 A | 6/1987 | Policastro |
| 4,708,986 A | 11/1987 | Gerth et al. |
| 4,788,001 A | 11/1988 | Narula |
| 4,810,763 A | 3/1989 | Mallya et al. |
| 4,885,350 A | 12/1989 | Yamashita et al. |
| 4,904,733 A | 2/1990 | Gerth et al. |
| 4,954,565 A | 9/1990 | Liles |
| 4,977,213 A | 12/1990 | Giroud-Abel et al. |
| 5,061,766 A | 10/1991 | Yamashita et al. |
| 5,189,107 A | 2/1993 | Kasai et al. |
| 5,250,621 A | 10/1993 | Lütjens et al. |
| 5,270,380 A | 12/1993 | Adamson et al. |
| 5,300,555 A | 4/1994 | Weih et al. |
| 5,344,675 A | 9/1994 | Snyder |
| 5,349,029 A | 9/1994 | Nam |
| 5,358,981 A | 10/1994 | Southwick |
| 5,409,967 A | 4/1995 | Carson et al. |
| 5,559,159 A | 9/1996 | Sublett et al. |
| 5,594,059 A | 1/1997 | Mason et al. |
| 5,612,407 A | 3/1997 | Southwick |

(List continued on next page.)

FOREIGN PATENT DOCUMENTS

| | | |
|---|---|---|
| CA | 2019716 | 1/1991 |
| EP | 0232694 | 8/1987 |

(List continued on next page.)

OTHER PUBLICATIONS

Majumdar et al., "Effect of Extruder Type on the Properties and Morphology of Reactive Blends Based on Polyamides," *Journal of Applied Polymer Science*, 54, 339–354 (1994).

Hobbs er al., "Toughened Nylon Resins," *Polymer Engineering and Science*, vol. 23, 7 380–389 (1993).

Flexman, E.A., "Toughened Semicrystalline Engineering Polymers: Morphology, impacts Resistance and Fractrrure Mechanism," *American Chemical Society*, 79–104 (1993).

Primary Examiner—Tae H. Yoon
(74) Attorney, Agent, or Firm—Bernard J. Graves, Jr. Esq.; Michael K. Carrier, Esq.

(57) ABSTRACT

The invention pertains to methods for preparing modified condensation polymers wherein the steps include: (a) preparing a polymer colloid system comprising a first polymer dispersed in a liquid continuous phase; (b) introducing the polymer colloid system into a glycolysis reaction medium prior to or during a glycolysis reaction wherein the glycolysis reaction medium comprises a polyester, copolyester, polyesteramide, polycarbonate or a mixture thereof; wherein the glycolysis reaction medium optionally comprises a diol component; and polymerizing the fully or partially glycolyzed polyester, copolyester, polyesteramide, polycarbonate or mixture thereof, thereby providing a condensation polymer/first polymer matrix.

22 Claims, No Drawings

U.S. PATENT DOCUMENTS

| | | |
|---|---|---|
| 5,652,306 A | 7/1997 | Meyer et al. |
| 5,674,937 A | 10/1997 | Berg et al. |
| 5,677,366 A | 10/1997 | Wu |
| 5,726,277 A * | 3/1998 | Salsman |
| 5,891,950 A | 4/1999 | Collins et al. |

FOREIGN PATENT DOCUMENTS

| | | |
|---|---|---|
| EP | 0232695 | 8/1987 |
| EP | 0255137 B1 | 2/1988 |
| EP | 0317057 | 5/1989 |
| EP | 0365234 | 4/1990 |
| EP | 0377447 | 7/1990 |
| EP | 0377533 | 7/1990 |
| EP | 0407834 | 1/1991 |
| EP | 0440970 A2 | 8/1991 |
| EP | 0517171 A2 | 12/1992 |
| EP | 0581224 | 2/1994 |
| EP | 0752448 | 1/1997 |
| JP | 54157157 | 12/1979 |
| JP | 60040182 A | 3/1985 |
| JP | 63186703 A | 8/1988 |
| JP | 64001786 A | 1/1989 |
| JP | 1123854 A | 5/1989 |
| JP | 1163254 A | 6/1989 |
| JP | 2016145 A | 1/1990 |
| JP | 2024346 A | 1/1990 |
| JP | 2155944 A | 6/1990 |
| JP | 4175370 | 6/1992 |
| JP | 04335002 A | 11/1992 |
| JP | 06184217 | 7/1994 |
| KR | 9503803 | 4/1995 |
| WO | WO 89/03860 | 5/1989 |
| WO | WO 94/01482 | 1/1994 |
| WO | WO 95/22570 | 8/1995 |
| WO | WO 96/30428 | 10/1996 |
| WO | WO 98/02479 | 1/1998 |

* cited by examiner

METHODS OF MAKING MODIFIED CONDENSATION POLYMERS

CROSS REFERENCE TO RELATED APPLICATIONS

This application is a divisional of, and claims the benefit of, application Ser. No. 09/262,156, filed Mar. 3, 1999, which status is pending. The Ser. No. 09/262,156 application is a continuation-in-part of U.S. application Ser. No. 09/141, 051, filed on Aug. 27, 1998, now abandoned, which claims priority to U.S. provisional application Serial Nos. 60/057, 714 and 60/058,008, both of which were filed on Aug. 28, 1997. This application is also a continuation-in-part of U.S. application Ser. No. 09/141,054, filed on Aug. 27, 1998, now abandoned, which claims priority to U.S. provisional application Serial Nos. 60/057,714 and 60/058,008, both of which were filed on Aug. 28, 1997. U.S. application Ser. Nos. 09/262,156, 09/141,051, 09/141,054, 60/057,714 and 60/058,008 are each incorporated herein by this reference in their entireties.

FIELD OF THE INVENTION

The present invention relates to diol latex compositions, and methods for making such diol latex compositions. The diol latex compositions are preferably produced with diol as the major component of the continuous phase.

The present invention further relates to modified condensation polymers, and methods for making such polymers. The condensation polymers are produced using a polymer colloid system preferably comprising a diol component. In a preferred embodiment, the polymer colloid system comprises the diol latex composition of the present invention. The polymer colloid system may also comprise a water-based latex composition. The condensation polymers of the present invention are heterophase materials.

BACKGROUND OF THE INVENTION

With regard to the first major embodiment of the present invention, latex polymers are utilized in a variety of products due to the unique features of their delivery system. Latex polymers, by nature, have lower viscosities than their solution counterparts. This lower viscosity allows for higher polymer concentrations to be delivered in an application without encountering the numerous problems associated with high viscosity fluids. The reason for the unique viscosity behavior of latex polymers results from the heterogeneity of the system. The fact that the latex polymers are dispersed, rather than dissolved, in a continuous low viscosity medium reduces the influence of the latex polymer on the viscosity of the media. Therefore, the continuous phase or solvent of the latex is the dominant component affecting the viscosity of the system.

Typically, the continuous phase of most commercial latexes is water. This is beneficial in that water has low toxicity and is not flammable. Water is a good choice when the continuous phase is to be used as a delivery system for the polymer. In some circumstances, however, water may be detrimental to the substrate, or it may be necessary to change the drying characteristics of the latex.

Solvents other than water may be used in the continuous phase. For example, the addition of diol solvents in minor amounts is known. JP 04335002 teaches the addition of alcohol(s) as an antifreeze agent for the production of vinyl ester emulsions at low temperatures. The amount of the diol solvent disclosed is below 50 wt. %. JP 63186703 teaches the addition of film forming agents and plasticizers in an amount up to 10 wt. % of the solid component to effect film formation properties of the resulting emulsion. JP06184217 teaches the addition of polyols and water-soluble inorganic salts to vinyl chloride suspension polymerizations to produce vinyl chloride polymers that have good powder fluidity. EP 255137 teaches the use of water soluble alcohol in a water/alcohol level of 100/0 to 50/50 for producing polyvinylester with a high degree of polymerization.

U.S. Pat. No. 3,779,969 describes the use of propylene diol or diethylene diol in amounts of 10–50 wt % of the emulsion. The ethylene diol is added to impart improved wetting properties to the emulsion.

U.S. Pat. No. 4,458,050 describes a process for the manufacture of polymer dispersions in diol chain extenders. The patent relates to the production of polymers which have low viscosity for the preparation of polyurethanes. The '050 patent does not teach compositions which result in stabilized latexes in diol solvents. The patent also teaches large amounts of polymeric stabilizers to produce the dispersion polymer.

JP 60040182 and JP 64001786 teach compositions for water-oil repellency for fabric treatment. The compositions are aimed at producing fluoropolymer emulsions in a mixture of diol solvents. Such fluoropolymers are not the subject of this invention.

U.S. Pat. No. 4,810,763 teaches suspension polymerization in an organic medium for the preparation of pressure sensitive adhesives. The compositions described in the '763 patent are specifically aimed at producing large particle size dispersions. This patent does not disclose compositions which size latexes having a particle size below 1000 nm. This reference also does not disclose emulsion polymerization.

U.S. Pat. No. 4,885,350 and U.S. Pat. No. 5,061,766 teach the dispersion polymerization of vinyl monomers in hydrophilic organic liquids. To produce the dispersion polymer, large amounts of polymeric dispersion stabilizers are taught.

Prior to the present invention, it had not been previously known to utilize 40%, more preferably 60% or greater, of diol, by weight of the continuous phase, in the continuous phase of a latex polymer. This amount of diol has been found in the invention herein to provide certain advantages in a latex composition, such as improved compatibility with a particular substrate, better drying characteristics of the latex, or it can be used in the second major embodiment of the invention (production of a condensation polymer/first polymer matrix).

With regard to the second major embodiment of the present invention, it is known to modify condensation polymers by blending the condensation polymer with another polymer in an extruder. For example, to improve the impact properties of a polyester, a low Tg elastomer is typically added to the polyester in a twin-screw extruder. Japan Kokai JP 02155944 describes compounds for moldings comprising physical blends of saturated polyester with polystyrene polymers containing 1–100 phr glycidylamido-grafted olefin polymers of glycidyl methacrylate-graft olefin polymers. Jpn. Kokai JP 02016145, JP 02024346, JP 01123854, JP 01153249 and JP 01163254 each teach the blending of aromatic polyesters with resins prepared by graft emulsion copolymerization. In each of these references, the size of the dispersed phase is said to be critical in obtaining good properties. However, this is an energy intensive process, sometimes resulting in an undesirable reduction in the physical properties of the polymer, in particular the molecular weight. Further, a blending step is required, which utilizes more resources and more time.

U.S. Pat. Nos. 5,652,306, 4,180,494 and 5,409,967 disclose compositions for impact modification of aromatic polyesters that involve blending an acrylic or polybutadiene/acrylic rubber powder with polyethylene terephthalate (PET). The acrylic rubber particles are prepared by typical core/shell emulsion polymerization and then harvested by spray drying the latex. The procedure for latex harvesting is outlined in U.S. Pat. No. 3,895,703.

The extrusion blending of an elastomer and a plastic is labor intensive and time consuming. Typically, polybutadiene or poly(butyl acrylate) are used as the low Tg (glass transition temperature) polymer to impact modify the polyester. These low Tg elastomers are difficult to handle and require that a second monomer, typically poly(methyl methacrylate) be utilized as a shell surrounding the low Tg polymer core so that the low Tg polymer may be handled. The core-shell polymer is isolated, dried and then added to the polyester in an extruder.

There exists a need for a process for producing a polymer blend by more economical methods. It would also be desirable be able to utilize both core shell and/or non core shell polymers in a process for producing a polymer blend, again, in an economical fashion. Further, it would be desirable to utilize novel polymer sources, for example glycolyzed polymers, for producing a polymer blend. Also, it would be desirable to utilize reinforcing agents, e.g., glass fibers, to improve the physical properties of the resulting polymer blends. Moreover, it would be desirable to modify the characteristics of the polymer blends of the present invention by utilizing a buffered system. Still further, it would be desirable to obtain thermoplastic elastomeric materials according to the present invention. Such needs have been satisifed by the present invention, which can achieve such polymer blends in a polymerization reactor, wherein the physical properties of the resulting condensation polymers are maintained or improved. Still further, latex polymer compositions of improved properties are also provided.

SUMMARY OF THE INVENTION

In one aspect, the invention provides a diol latex composition comprising:
 a. latex polymer particles comprising a residue of an ethylenically unsaturated monomer, wherein the latex polymer particles have a size below 1000 nm;
 b. a surfactant; and
 c. a continuous liquid phase comprising a diol component, wherein the diol component comprises from 60 to 100% by weight of the continuous phase;
 wherein the latex polymer particles are dispersed in the continuous phase.

In a further aspect, the invention provides a diol latex composition comprising:
 a. latex polymer particles comprising a residue of an ethylenically unsaturated monomer, wherein the latex polymer particles have a size below 1000 nm;
 b. a surfactant; and
 c. a liquid continuous phase comprising a diol component, wherein the diol component is from 40 to 100% by weight of the continuous phase, and wherein the diol component consists essentially of tripropylene diol, 1,4-butanediol, neopentyl diol, cyclohexanedimethanol or a mixture thereof, and wherein the latex particles are dispersed in the continuous phase.

In another aspect, the invention provides a method of making a condensation polymer/first polymer matrix comprising the steps of:
 a. preparing a polymer colloid system comprising a first polymer dispersed in a liquid continuous phase;
 b. introducing the polymer colloid system into a, condensation reaction medium prior to or during the condensation reaction, wherein the condensation reaction medium comprises (1) a diacid, di-isocyanate, dialkyl carbonate, diaryl carbonate, dihalo carbonate or a mixture thereof, wherein the liquid continuous phase, the condensation reaction medium or both comprises a diol component; and
 c. polymerizing the diol component and component b(1), thereby forming a condensation polymer/first polymer matrix.

In a further aspect, the invention provides a method of making a condensation polymer/first polymer matrix comprising the steps of:
 a. preparing a polymer colloid system comprising a first polymer dispersed in a liquid continuous phase;
 b. introducing the polymer colloid system into a glycolysis reaction medium prior to or during the glycolysis reaction wherein the glycolysis reaction medium comprises a polyester, copolyester, polyesteramide, polycarbonate or a mixture thereof;
 wherein the liquid continuous phase, the gylcolysis reaction medium, or both comprises a diol component; and
 c. polymerizing the fully or partially glycolyzed polyester, copolyester, polyesteramide, polycarbonate or mixture thereof, thereby providing a condensation polymer/first polymer matrix.

In still a further aspect, the invention provides a method of making a condensation polymer/latex matrix comprising the steps of:
 a. preparing a latex diol composition comprising:
  (i) latex polymer particles comprising a residue of an ethylenically unsaturated monomer, wherein the latex polymer particles have a size below 1000 nm;
  (ii) a surfactant; and
  (iii) a continuous liquid phase comprising a diol component, wherein the diol component is from 60 to 100% by weight of the latex diol composition;
 b. introducing the diol latex composition into a condensation reaction medium comprising 1) a diacid, di-isocyanate, dialkyl carbonate, diaryl carbonate, dihalo carbonate or a mixture thereof; and
 c. polymerizing the diol component and component bl) thereby forming a condensation polymer/latex polymer matrix.

In yet a further aspect, the invention provides a polymer blend comprising a first polymer and a condensation polymer, wherein the first polymer is a non core-shell polymer derived from a polymer colloid system.

In still a further aspect, the invention provides a method of making a condensation polymer/first polymer matrix comprising the steps of:
 a. introducing a polymer colloid system into a condensation reaction medium prior to or during the condensation reaction;
 wherein the condensation reaction medium comprises:
  i. a diacid, di-isocyanate, dialkyl carbonate, diaryl carbnate, dihalo carbonate, or a mixture thereof;
 wherein the polymer colloid system comprises:
  ii. a first polymer dispersed in a liquid continuous phase;

wherein the polymer colloid system continuous phase, the condensation reaction medium or both comprises a diol component; and b. polymerizing the diol component and component (a)(i) thereby providing a condensation polymer/first polymer matrix.

Still further, the invention provides a method of making a condensation polymer/first polymer matrix comprising the steps of:

a. preparing a polymer colloid system comprising a first polymer in a liquid continuous phase;

b. introducing the polymer colloid system into a condensation polymer;

c. extruding the polymer colloid system and the condensation polymer, thereby providing a condensation polymer/first polymer matrix.

The invention further provides products made by the processes disclosed herein.

Additional advantages of the invention will be set forth in part in the description that follows, and in part will be apparent from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, and, as such, may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms a, an and the include plural referents unless the context clearly dictates otherwise.

Optional or optionally means that the subsequently described event or circumstances may or may not occur, and that the description included instances where said event or circumstance occurs and instances where it does not.

Latex is herein defined as a dispersion of polymeric particles in a continuous phase, the polymeric particles preferably having a size range of from 10 to 1000 nm. The polymeric particles are preferably produced through emulsion polymerization. Latex particle is herein defined as such a polymeric particle, which is dispersed in a continuous phase.

Diol is a synonym for glycol or dihydric alcohol. Polyol is a polyhydric alcohol containing three or more hydroxyl groups.

The abbreviation "nm" means nanometers.

Ranges are often expressed herein as from about one particular value, and/or to about another particular value. When such a range is expressed, it is to be understood that another embodiment is from the one particular value and/or to the other particular value. Similarly, when values are expressed as approximations, by use of the antecedent "about," it will be understood that the particular value is another embodiment.

Throughout this application, where publications are referenced, the disclosures of these publications in their entireties are hereby incorporated by reference into this application in order to more fully describe the state of the art to which this invention pertains.

In one aspect, the invention provides a diol latex composition comprising:

a. latex polymer particles comprising a residue of an ethylenically unsaturated monomer, wherein the latex polymer particles have a size below 1000 nm;

b. a surfactant; and c. a continuous liquid phase comprising a diol component, wherein the diol component comprises from 60 to 100% by weight of the continuous phase;

wherein the latex polymer particles are dispersed in the continuous phase.

In a further aspect, the invention provides a diol latex composition comprising:

a. latex polymer particles comprising a residue of an ethylenically unsaturated monomer, wherein the latex polymer particles have a size below 1000 nm;

b. a surfactant; and c. a liquid continuous phase comprising a diol component, wherein the diol component is from 40 to 100% by weight of the continuous phase, and wherein the diol component consists essentially of tripropylene diol, 1,4-butanediol, neopentyl diol, cyclohexanedimethanol or a mixture thereof, and wherein the latex particles are dispersed in the continuous phase.

In another aspect, the invention provides a method of making a condensation polymer/first polymer matrix comprising the steps of:

a. preparing a polymer colloid system comprising a first polymer dispersed in a liquid continuous phase;

b. introducing the polymer colloid system into a condensation reaction medium prior to or during the condensation reaction, wherein the condensation reaction medium comprises (1) a diacid, di-isocyanate, dialkyl carbonate, diaryl carbonate, dihalo carbonate or a mixture thereof, wherein the liquid continuous phase, the condensation reaction medium or both comprises a diol component; and d. polymerizing the diol component and component b(1), thereby forming a condensation polymer/first polymer matrix.

In a further aspect, the invention provides a method of making a condensation polymer/first polymer matrix comprising the steps of:

a. preparing a polymer colloid system comprising a first polymer dispersed in a liquid continuous phase;

b. introducing the polymer colloid system into a glycolysis reaction medium prior to or during the glycolysis reaction wherein the glycolysis reaction medium comprises a polyester, copolyester, polyesteramide, polycarbonate or a mixture thereof;

wherein the liquid continuous phase, the gylcolysis reaction medium, or both comprises a diol component; and c. polymerizing the fully or partially glycolyzed polyester, copolyester, polyesteramide, polycarbonate or mixture thereof, thereby providing a condensation polymer/first polymer matrix.

In still a further aspect, the invention provides a method of making a condensation polymer/latex matrix comprising the steps of:

a. preparing a latex diol composition comprising:
   (i) latex polymer particles comprising a residue of an ethylenically unsaturated monomer, wherein the latex polymer particles have a size below 1000 nm;
   (ii) a surfactant; and
   (iii) a continuous liquid phase comprising a diol component, wherein the diol component is from 60 to 100% by weight of the latex diol composition;
b. introducing the diol latex composition into a condensation reaction medium comprising 1) a diacid, di-isocyanate, dialkyl carbonate, diaryl carbonate, dihalo carbonate or a mixture thereof; and
c. polymerizing the diol component and component b1) thereby forming a condensation polymer/latex polymer matrix.

In yet a further aspect, the invention provides a polymer blend comprising a first polymer and a condensation polymer, wherein the first polymer is a non core-shell polymer derived from a polymer colloid system.

In still a further aspect, the invention provides a method of making a condensation polymer/first polymer matrix comprising the steps of:

a. introducing a polymer colloid system into a condensation reaction medium prior to or during the condensation reaction;
   wherein the condensation reaction medium comprises:
      i. a diacid, di-isocyanate, dialkyl carbonate, diaryl carbnate, dihalo carbonate, or a mixture thereof;
   wherein the polymer colloid system comprises:
      ii. a first polymer dispersed in a liquid continuous phase;
   wherein the polymer colloid system continuous phase, the condensation reaction medium or both comprises a diol component; and
c. polymerizing the diol component and component (a)(i) thereby providing a condensation polymer/first polymer matrix.

Still further, the invention provides a method of making a condensation polymer/first polymer matrix comprising the steps of:

a. preparing a polymer colloid system comprising a first polymer in a liquid continuous phase;
b. introducing the polymer colloid system into a condensation polymer;
c. extruding the polymer colloid system and the condensation polymer, thereby providing a condensation polymer/first polymer matrix.

The invention further provides products made by the processes disclosed herein.

In the first aspect, the present invention concerns a diol latex composition and methods for making such diol latex compositions, in which the diol latex compositions comprise a latex polymer derived from a polymerization of an ethylenically unsaturated monomer in the presence of a free radical initiator, a suitable surfactant and a diol continuous phase in which the polymer is not soluble. The diol latex composition is produced through an emulsion polymerization process, in which the continuous phase of the emulsion comprises a diol component or a combination of diol(s) with other (co) solvents.

In the second major aspect, the invention is concerned with the introduction of polymer colloid systems, preferably comprising a diol component as a co-reactant, in a condensation polymerization process. The diol component may be used as a co-reactant in condensation polymerization reactions to produce polyesters, polycarbonates, polyurethanes, polyesteramides or any other condensation polymerization in which diols are employed.

More particularly, this second major aspect of the invention includes methods and compositions for incorporating polymer particles during a condensation polymerization involving a diol, by introducing a polymer colloid system into the condensation reaction. In one embodiment of the invention, the polymer colloid system is the diol latex composition of the first major aspect of the invention, in which the continuous phase comprising the diol component serves as the source of the diol in the condensation polymerization. In another embodiment, the polymer colloid system comprises a water-based continuous phase. The water-based continuous phase may or may not comprise a diol component. In a further embodiment, the polymer colloid system comprises a diol-based continuous phase.

If the polymer colloid system is properly stabilized, the polymer colloid system retains its integrity and remains a dispersed phase within the resulting condensation polymer matrix. Depending on the nature of the polymer particles, the physical characteristics of the condensation polymer can be modified. This invention includes compositions and methods useful for producing polymers in which a first polymer, the polymer comprising the polymer colloid system, is incorporated during the polymerization of second polymer, the condensation polymer.

The resulting condensation polymer includes the polymer particles comprising the polymer colloid system, wherein the polymer particles are preferably dispersed in the solid condensation polymer continuous phase. This provides polymer blends with improved physical properties. For example, if the diol latex polymer is a low Tg rubber and the condensation polymer is a polyester, such as poly(ethylene terephthalate) (PET), the resulting condensation polymer blend can exhibit improved impact resistance.

I. The Diol Latex Compositions

As mentioned, in a first major aspect, this invention concerns the preparation of a diol latex composition by emulsion polymerization, wherein the continuous phase comprises a diol component. The diol latex composition may be used for a variety of purposes, including, but not limited to, ink compositions, pigment concentrates, coatings, and as reactants in condensation polymerization processes. The diol latex composition comprises a latex polymer and a continuous phase, the continuous phase comprising a diol component. As used herein, the term "diol latex composition" includes latexes comprised of both core shell and/or non-core shell latex polymers.

Diol components useful for the continuous phase of the diol latex compositions include, but are not limited to, any aliphatic or cycloaliphatic diol having from about 2 to about 10 carbon atoms and mixtures thereof. Preferred diols include ethylene diol, 1,3-trimethylene diol, propylene diol, tripropylene diol, 1,4-butanediol, 1,5-pentanediol, 1,6-hexanediol, 1,7-heptanediol, 1,8-octanediol, 1,9-nonanediol, neopentyl diol, cis- or trans-cyclohexanedimethanol, cis- or trans-2,2,4,4-tetramethyl-1,3-cyclobutanediol, diethylene diol, 2,2,4-trimethyl-1,3-pentanediol, 2-methyl-1,3-propanediol, 2-methyl-1,3-pentanediol, or mixtures thereof, more preferred diols include ethylene diol, propylene diol, tripropylene diol, 1,4-butanediol, diethylene diol, neopentyl diol, cis and trans-cyclohexanedimethanol and mixtures thereof; even more preferred diols include neopentyl diol, ethylene diol, cis or trans cyclohexanedimethanol, 1,4 butanediol, or a mixture thereof.

In addition to the diol component, the continuous phase may contain one or more polyol components. Representative polyol components that may be used in the continuous phase include, but are not limited to, glycerol, trimethylolpropane, pentaerythritol, 1,2,6-hexanetriol, sorbitol, 1,1,4,4-tetrakis (hydroxymethyl)cyclohexane, tris-(2,hydroxyethyl) isocyanurate, dipentaaerythritol and mixtures thereof. In addition to low molecular weight polyols, higher molecular weight polyols (MW 400–3000), preferably triols derived by condensing alkylene oxides having from 2 to 3 carbons, e.g., ethylene oxide or propylene oxide, with polyol initiators, having from 3 to 6 carbons, e.g., glycerol, can also be used.

The continuous phase may also comprise a cosolvent. These cosolvents include, but are not limited to water, methanol, ethanol, propanol, n-butanol, and mixtures thereof The cosolvent may be present in the amount of less than 60% by weight, more preferably less than 40% by weight, based on the total weight of the continuous phase.

As used herein, the total weight of the continuous phase includes the weight of the diol component, polyol component, and co-solvent. The weight of any surfactant is not included in the total weight of the continuous phase.

In one embodiment, the diol component is present in an amount of from 60 to 100% by weight, based on the total weight of the continuous phase, preferably from 65 to 100% by weight, based on the total weight of the continuous phase, more preferably, from 75 to 100% by weight, based on the total weight of the continuous phase, more preferably, from 90 to 100% by weight, based on the total weight of the continuous phase, and even more preferably, 100% by weight, based on the total weight of this continuous phase. In a further embodiment, the diol containing phase consists essentially of the diol component.

In an alternative embodiment, the diol component is present in an amount of from 40 to 100% by weight, based on the total weight of the continuous phase, preferably from 50 to 100% by weight, based on the total weight of the continuous phase, more preferably, from 65 to 100% by weight, based on the total weight of the continuous phase and even more preferably, from 90 to 100% by weight, based on the total weight of the continuous phase. In a further embodiment, the continuous phase consists essentially of the diol component. The total weight of the continuous phase includes the weight of the diol component, polyol component and co-solvent. As noted, the weight of any surfactant is not included in the total weight of the continuous phase. In this embodiment, the diol component consists essentially of tripropylene glycol, 1,4-butanediol, neopentyl glycol, cyclohexanedimethanol or a mixture thereof.

The diol latex compositions of this invention are preferably prepared by emulsion polymerization. The solids content of the reaction is preferably from 5 to 60% by weight, more preferably, from 20 to 50% by weight. The particle size of the latex polymer particles of the diol latex composition is preferably below 1000 nm, more preferably from 20 to 700 nm, even more preferably from 60 to 250 nm. The temperature of the reaction is preferably from 0 to 190° C., more preferably from 60 to 90° C.

A surfactant is preferably used to prepare the diol latex compositions. One of skill in the art would recognize that the type and amount of surfactant used in the emulsion polymerization depends on the monomer combinations and the polymerization conditions. Surfactants used in the emulsion polymerization may be anionic, cationic, or nonionic surfactants. Anionic surfactants that may be used in the invention include surfactants such as alkali metal or ammonium salts of alkyl, aryl or alkylaryl sulfonates, sulfates, phosphates and mixtures thereof. Further, suitable nonionic surfactants include, but are not limited to, alkyl and alkylaryl polydiol ethers, such as ethoxylation products of lauryl, oleyl and stearyl alcohols; alkyl phenol glycol ethers, including but not limited to, ethoxylation products of octyl or nonylphenol. Suitable surfactants may be found in *McCutcheon's Volume I: Emulsifiers and Detergents* 1996 *North American Edition,* MC Publishing Co., Glen Rock, N.J., 1996.

The surfactant may or may not be reactive in the polymerization. In one embodiment, useful surfactants are the sulfate/sulfonate salts of nonyl phenol and alkyl alcohol ethoxylates. Preferred surfactants include, but are not limited to, polymerizable or nonpolymerizable alkyl ethoxylate sulfates, alkyl phenol ethoxylate sulfates, alkyl ethoxylates, alkyl phenol ethoxylates or mixtures thereof.

The latex polymers of the diol latex compositions may be prepared by any conventional means known in the art. The monomers that are used to form the latex polymers may be broadly characterized as ethylenically unsaturated monomers. These include, but are not limited to, non-acid vinyl monomers, acid vinyl monomers and/or mixtures thereof. The latex polymers of the invention may be copolymers of non-acid vinyl monomers and acid monomers, mixtures thereof and their derivatives. The latex polymers of the invention may also be homopolymers of ethylenically unsaturated monomers.

Suitable non-acid vinyl monomers that may be used to prepare the latex polymer include, but are not limited to, acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, isoprene, octyl acrylate, octyl methacrylate, iso-octyl acrylate, iso-octyl methacrylate, trimethyolpropyl triacrylate, styrene, α-methyl styrene, glycidyl methacrylate, carbodiimide methacrylate, $C_1$–$C_{18}$ alkyl crotonates, di-n-butyl maleate, α or -β-vinyl naphthalene, di-octylmaleate, allyl methacrylate, di-allyl maleate, di-allylmalonate, methyoxybutenyl methacrylate, isobornyl methacrylate, hydroxybutenyl methacrylate, hydroxyethyl (meth)acrylate, hydroxypropyl(meth)acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, butadiene, vinyl ester monomers, vinyl(meth)acrylates, isopropenyl(meth) acrylate, cycloaliphaticepoxy(meth)acrylates, ethylformamide, 4-vinyl-1,3-dioxolan-2-one, 2,2-dimethyl-4 vinyl-1,3-dioxolane, and 3,4-di-acetoxy-1-butene or a mixture thereof. Suitable monomers are described in *The Brandon Associates,* 2nd edition, 1992 Merrimack, N.H., and in *Polymers and Monomers,* the 1966–1997 Catalog from Polyscience, Inc., Warrington, Pa., U.S.A.

Acid vinyl monomers that may be used to prepare the latex polymer include, but are not limited to, acrylic acid, methacrylic acid, itaconic acid, crotonic acid, and monovinyl adipate.

Preferred monomers useful for making the latex polymer/ (co)polymer are ethylenically unsaturated monomers including, but not limited to, acrylates, methacrylates, vinylesters, styrene, styrene derivatives, vinyl chloride, vinylidene chloride, acrylonitrile, isoprene and butadiene. In a more preferred embodiment, the latex polymer comprises (co)polymers made from monomers of 2-ethyl-hexyl acrylate, styrene, butylacrylate, butylmethacrylate, ethylacrylate, methylmethacrylate, butadiene and isoprene.

In a preferred embodiment, the molecular weight of the latex polymer is a weight average molecular weight (Mw) of from 1,000 to 1,000,000 as determined by gel permeation chromatography (GPC), more preferably a weight average molecular weight of from 5000 to 250,000. In one embodiment, the glass transition temperature (Tg) of the latex polymer is less than or equal to about 170° C.

The diol latex compositions of this invention may be characterized as stabilized latexes in a continuous phase comprising a diol component. A stable latex is defined for the purposes of this invention as one in which the particles are colloidally stable, i.e., the latex particles remain dispersed in the continuous phase for long periods of time, such as 24 hours, preferably 48 hours, even more preferably, one week.

The latex polymer particles generally have a spherical shape. As noted previously, the latex polymer utilized in the diol latex compositions of the present invention may be a core shell polymer or a non core-shell polymer. When a core shell polymer is utilized, the polymers may be prepared in a core/shell fashion by staging the monomer addition. For example, the composition of the monomer feed of the polymerization may be changed over the course of the reaction in an abrupt fashion, resulting in a distinct core and shell portion to the polymer.

Preferred monomers useful for making the core-shell latex polymer/(co)polymer are ethylenically unsaturated monomers including, but not limited to, acrylates, methacrylates, vinylesters, styrene, styrene derivatives, vinyl chloride, vinylidene chloride, acrylonitrile, isoprene and butadiene. In a more preferred embodiment, the core-shell latex polymer comprises (co)polymers made from monomers of 2-ethyl-hexyl acrylate, styrene, butylacrylate, butylmethacrylate, ethylacrylate, methylmethacrylate, butadiene and isoprene.

The core/shell polymer particles may also be prepared in a multilobe form, a peanut shell, an acorn form, or a raspberry form. That in such particles, the core portion can comprise from about 20 to about 80 percent of the total weight of said particle and the shell portion can comprise from about 80 to about 20 percent of the total weight volume of the particle.

In one preferred embodiment, chain transfer agents are used in the emulsion polymerization. Typical chain transfer agents are those known in the art. Chain transfer agents that may be used in the emulsion polymerization reaction to form the diol latex compositions include, but are not limited to, butyl mercaptan, dodecyl mercaptan, mercaptopropionic acid, 2-ethylhexyl-3-mercaptopropionate, n-butyl-3-mercaptopropionate, octyl mercaptan, isodecyl mercaptan, octadecyl mercaptan, mercaptoacetate, allyl mercaptopropionate, allyl mercaptoacetate, crotyl mercaptoproprionate, crotyl mercaptoacetate, and the reactive chain transfer agents disclosed or described in U.S. Pat. No. 5,247,040, which is incorporated herein by this reference. Preferably the chain transfer agent is selected from the mercaptans and various alkyl halides, including but not limited to carbon tetrachloride; more preferably the chain transfer agent is 2-ethylhexyl-3-mercaptopropionate. Chain transfer agents can be added in amounts from 0 to 2 parts per hundred monomer (phm), more preferably 0 to 0.5 phm.

The latex polymers of the invention can be uncrosslinked or crosslinked. When crosslinked, suitable crosslinking agents include multifunctional unsaturated compounds including, but not limited to, divinyl benzene, allyl methacrylate, allyl acrylate, multifunctional acrylates and mixtures thereof Suitable multifunctional acrylates include, but are not limited to, ethylene diol dimethacrylate, ethylene diol diacrylate, trimethylolpropane triacrylate, trimethylolpropane trimethacrylate, pentaerythritoltetraacrylate and mixtures thereof. The amount of the crosslinking monomer in the emulsion polymerization can be controlled to vary the gel fraction of the latex from 20 to 100 percent. The gel fraction is the amount that will not dissolve in a good solvent.

The latex particles may be functionalized by including monomers with pendent functional groups. Functional groups that may be incorporated in the latex particle include, but are not limited to, epoxy groups, acetoacetoxy groups, carbonate groups, hydroxyl groups amine groups, isocyanate groups, amide groups, and mixtures thereof. The functional groups may be derived from a variety of monomers, including, but not limited to, glycidyl methacrylate, acetoacetoxy ethyl methacrylate, vinyl ethylene carbonate, hydroxyl ethyl methacrylate, t-butylaminoethyl methacrylate, dimethylamino methacrylate, m-isopropenyl-alpha,alpha-dimethylbenzyl isocyanate, acrylamide and n-methylolacrylamide. The addition of functional groups allows for further reaction of the polymer after latex synthesis. The functionality may be useful to impart latent crosslinking or it may be used to react with condensation polymers as discussed in Section II, below.

Initiators can be used in the emulsion polymerization to form the diol latex compositions, which include, but are not limited to salts of persulfates, water or diol soluble organic peroxides and azo type initiators. Preferred initiators include, but are not limited to hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and mixtures thereof. Redox initiation systems (Reduction Oxidation Initiation) such as iron catalyzed reaction of t-butyl hydroperoxide with isoascorbic acid are also useful. It is preferable not to use initiators capable of generating a strong acid as a by-product. This avoids possible side reactions of the diol component of the solvent with the acid. Initiators can be added in amounts from 0.1 to 2 phm, more preferably from 0.3 to 0.8 phm.

Reducing agents may also be used in the emulsion polymerization. Suitable reducing agents are those that increase the rate of polymerization and include, for example, sodium bisulfite, sodium hydrosulfite, sodium formaldehyde sulfoxylate, ascorbic acid, isoascorbic acid and mixtures thereof. If a reducing agent is introduced into the emulsion polymerization, it is preferably added in an amount of 0.1 to 2 phm, more preferably 0.3 to 0.8 phm. It is preferable to feed the reducing agent into the reactor over a period of time.

Buffering agents may also be used in the diol-containing emulsion polymerization to control the pH of the reaction. Suitable buffering agents include, but are not limited to, ammonium and sodium salts of carbonates and bicarbonates. It is preferred that the buffering agents be included when using acid generating initiators, including, but not limited to, the salts of persulfates.

Polymerization catalysts may also be used in the emulsion polymerization. Polymerization catalysts are those compounds that increase the rate of polymerization and which, in combination with the above described reducing agents, may promote decomposition of the polymerization initiator under the reaction conditions. Suitable catalysts include, but are not limited to, transition metal compounds such as, for example, ferrous sulfate heptahydrate, ferrous chloride, cupric sulfate, cupric chloride, cobalt acetate, cobaltous sulfate, and mixtures thereof.

In one embodiment, the diol latex composition is prepared by first forming an emulsion or solution comprising monomers, an initiator, a surfactant and a continuous phase. In a further embodiment, the continuous phase comprises 60 to 100% by weight of the diol component. The mixture is then heated which causes the monomer to polymerize and form the latex polymers. Typically, the monomer is fed into the reactor over a period of time, and a separate initiator feed is also fed into the reactor over time.

The diol latex composition may contain a stabilizer or a stabilizer does not have to be present. Stabilizers suitable for use in the diol latex composition include, but are not limited to an anionic stabilizer, a nonionic suspension stabilizer, an amphoteric suspension stabilizer or a mixture thereof. The suspension stabilizer must be soluble in the continuous phase, but should be substantially insoluble with the monomers. If present, the concentration of the suspension stabilizer is from 3 to 15 percent by weight of the monomers; preferably from 7 to 8 percent by weight of the monomers.

As the diol concentration in the continuous phase approaches about 100%, the wetting properties of the diol latex composition for hydrophobic surfaces improve, and the diol latex composition becomes less volatile. The reduced volatility of the diol latex composition is especially advantageous when the diol latex composition is used in a condensation reaction as disclosed in Section II, below.

The polymers produced by this invention are useful for thermoplastic engineering resins, elastomers, films, sheets and container plastics. The diol latex compositions of the invention are useful in a variety of coating compositions such as architectural coatings, maintenance coatings, industrial coatings, automotive coatings, textile coatings, inks, adhesives, and coatings for paper, wood, and plastics. Accordingly, the present invention further relates to such coating compositions containing a diol latex composition of the invention. The diol latex composition of the invention may be incorporated in those coating compositions in the same manner as known polymer latexes and used with the conventional components and/or additives of such compositions. The coatings may be clear or pigmented.

Upon formulation, a coating composition containing a diol latex composition of the invention may then be applied to a variety of surfaces, substrates, or articles, e.g., paper, plastic, steel, aluminum, wood, gypsum board, or galvanized sheeting (either primed or unprimed). The type of surface, substrate or article to be coated generally determines the type of coating composition used. The coating composition may be applied using means known in the art. For example, a coating composition may be applied by spraying or by coating a substrate. In general, the coating may be dried by heating, but preferably is allowed to air dry.

The coating composition contains the diol latex composition of the invention, and may further contain water, a solvent, a pigment (organic or inorganic) and/or other additives or fillers known in the art. Such additives or fillers, include, but are not limited to, leveling, rheology, and flow control agents such as silicones, fluorocarbons, urethanes, or cellulosics, extenders, reactive coalescing aids such as those described in U.S. Pat. No. 5,349,026, flatting agents, pigment wetting and dispersing agents and surfactants, ultraviolet absorbers, ultraviolet light stabilizers, tinting pigments, extenders, defoaming and antifoaming agents, anti-settling, anti-sag and bodying agents, anti-skinning agents, anti-flooding and anti-floating agents, fungicides and mildewcides, corrosion inhibitors, thickening agents, plasticizers, reactive plasticizers, curing agents or coalescing agents. Specific examples of such additives can be found in *Raw Materials Index,* published by the National Paint & Coatings Association, 1500 Rhode Island Avenue, NW, Washington, D.C. 20005, U.S.A.

The diol latex composition of the present invention can be utilized alone or in conjunction with other conventional polymers. Such polymers include, but are not limited to, polyesters, such as terephthalate based polymers, polyesteramides, cellulose esters, alkyds, polyurethanes, polycarbonates, epoxy resins, polyamides, acrylics, vinyl polymers, styrene-butadiene polymers, vinylacetate-ethylene copolymers, and mixtures thereof.

The diol latex compositions of the invention are also useful as reactants in condensation polymerizations. As reactants in condensation polymerizations, the diol latex compositions of this invention can be used to modify thermoplastic condensation polymers by coreacting the latex diols with diacids, diisocyanates, and dialkyl, diaryl- or dihalo-carbonates. Section II below, describes, as one of its embodiments, such a use of the diol latex composition as a reactant in a condensation polymerization. In addition, the invention can act as a convenient delivery method to deliver the latex polymer into the thermoplastic condensation polymer.

II. Modified Condensation Polymer Matrix

In a second major embodiment, the invention concerns the introduction of a polymer colloid system into a reaction that forms a condensation polymer, preferably resulting in a product having polymer particles entrapped in a condensation polymer matrix. The polymer colloid system that is introduced into the polymerization reaction is herein defined as polymer particles dispersed in a continuous phase, the polymer particles preferably having a particle size in the range of from about 0.020 microns to about 1000 microns. The continuous phase may contain small amounts of unreacted monomer, surfactant, etc. The polymer particles suitable for use in the polymer colloid system, which are herein defined as the first polymer, comprise the same polymers made from the ethylenically unsaturated monomers as those described in connection with the diol latex composition described in Section I, above, and may be functionalized or crosslinked in the same manner as that disclosed for the latex polymers of Section I. If functionalized, it is preferred that the functional groups include groups capable of reacting with a diacid, diisocyanate, diarylcarbonate, dialkylcarbonate, dihalocarbonate, or a diol component. These functional groups include, but are not limited to, epoxy, acid, hydroxyl, isocyanate, amine, amide, and carbonate groups or a mixture thereof.

The polymer colloid system may be prepared by a variety of methods, including, but not limited to, emulsion, suspension, dispersion polymerization and mechanical emulsification. In general, dispersion and suspension polymerization produce larger particle sizes, typically in the range of 1 to 500 microns, while emulsion polymerization produces particles of smaller sizes, typically in the range of 10 to 1000 nanometers. As used herein below, the first polymer of the polymer colloid system of the present invention includes both core shell and non-core shell-type latex polymers. In one embodiment, the polymer introduced into the condensation polymer reaction includes a glycolyzed polyester, copolyester, polyesteramide or polycarbonate.

In a preferred embodiment, the first polymer is a non core-shell polymer, and the first polymer of the polymer colloid system comprises from 50 to 100%, preferably 70 to 100%, even more preferably from 80 to 100% of the residues of one of the following monomers: 2-ethyl hexyl acrylate, butyl acrylate, isoprene, styrene, butadiene, or acrylonitrile.

Emulsion, suspension, dispersion and mechanical emulsification polymerization are known techniques of forming polymer colloid systems. If dispersion polymerization is selected to prepare the polymer colloid system that is introduced into the condensation polymerization reaction, processes similar to those described in U.S. Pat. No. 4,885,350 and U.S. Pat No. 5,061,766 may be used to prepare polymer colloid systems having a particle size range of 1 micron to 100 microns. If mechanical emulsification is used, processes similar to those described in U.S. Pat. Nos. 4,177,177, 5,358,981 and 5,612,407 may be utilized.

As used herein, the term "condensation polymerization" is used to refer to condensation polymerization reactions and "condensation polymer" is the product thereof. The term "condensation polymerization" as used herein is also used to refer more generally to polymerization reactions of the step-growth-type. As used herein, the term "condensation polymer" is synonymous with "step-growth polymer."

For either the emulsion, suspension, dispersion polymerized polymers or the mechanically emulsified polymer colloid system, to be introduced into the condensation reaction, the solvent or continuous phase may comprise water, diol or a mixture thereof. It is preferred, however, that the continuous phase comprises at least some diol, so that the diols in the continuous phase of the polymer colloid system may participate in the condensation polymerization reaction. In a particularly preferred embodiment, the polymer colloid system comprises the diol latex composition described in Section I, above. Further, the continuous phase of each polymer colloid system may consist essentially of water or diol, or may comprise any proportion of either component.

In the polymer colloid system comprising a diol based continuous phase, the diols in the continuous phase co-react with the diacids, diisocyanates, dialkyl or diaryl or dihalo carbonates, or mixtures thereof that comprise the reaction medium which forms the condensation polymer. In this embodiment, the diol component preferably comprises 25 to 100% by weight of the continuous phase, preferably 50 to 100% by weight of the continuous phase, more preferably from 70 to 100% by weight of the continuous phase, even more preferably from 90 to 100% by weight of the continuous phase. In a particularly preferred embodiment, the continuous phase consists essentially of the diol component. Suitable diol components for the diol-based continuous phase of the polymer colloid system include, but are not limited to, the diol components described above in Section I.

In one embodiment, the diol component may be present in either the continuous phase, the condensation reaction medium, or both. The diol concentration present in the original reaction medium may be adjusted to account for the diol concentration in the polymer colloid system. The polymer colloid system may be introduced into the condensation polymerization at various stages of the polymerization. For example, in a poly(ethylene terephthalate) (PET) polymerization, dimethyl terephthalate (DMT), ethylene diol (EG) and catalyst metal are placed in a flask and polymerized. The latex can be added: 1) up front, i.e., with the other materials at the start; 2) after the other starting materials have melted and formed a homogeneous solution; 3) after the DMT and EG have reacted in the first stage and given off MeOH; 4) right before $N_2$ is turned off and vacuum applied; 5) sometime during the final polycondensation phase, or anywhere in between, i.e., during the ester exchange phase.

Alternatively, the polymer colloid may be blended into the fully or partially formed condensation polymer directly in an extruder at temperatures from about 200 to about 320° C. In this process, since the polymer colloid system is added directly to the condensation polymer, there is no need to harvest the first polymer from the polymer colloid system. This provides a more economical process over those of the prior art.

The final polymer blend can be affected by the time the latex is added to the condensation polymer. While not wishing to be bound by any mechanism, it is understood that the size and shape of the emulsion polymer in the condensation polymer matrix can be affected by the time of the addition. Also, particular chemical interaction between emulsion polymers and condensation polymers are affected by time of addition, and they, in consequence, affect final blend properties.

In a preferred embodiment, the polymer colloid system comprises water, either with or without a diol component. In a preferred embodiment, the water component comprises about 10 to about 100% by weight of the continuous phase, further preferably, the water component comprises about 30 to about 100% by weight of the continuous phase, more preferably, the water component comprises about 50 to about 100% by weight of the continuous phase, still preferably, the water component comprises about 70 to about 100% by weight of the continuous phase, and, further preferably, the water component comprises about 90 to about 100% by weight of the continuous phase.

In a further embodiment, the polymer colloid system may preferably be introduced into the condensation polymerization at various stages of a glycolysis reaction. In such a process, a polyester, copolyester, polyesteramides or polycarbonates can be reduced in molecular weight by the additional of a glycol. This reaction takes place very rapidly at temperatures of about 200 to about 300° C., preferably at temperatures of about 240 to about 280° C.

The final blend can be affected by the time the latex is added to the glycolyzed polymer. For example, in the glycolysis of poly(ethylene terephthalate) (PET), the latex can be added after very little molecular weight reduction (from for example 0.7 Ih.V. to 0.6 Ih.V.), e.g., early in the glycolysis reaction, or after significant molecular weight reduction (from for example 0.7 Ih.V. to 0.05 Ih.V.), e.g., later in the glycolysis reaction. The final blend can be affected by the time at which the latex is added to the glycolyzed polymer. While not wishing to be bound by any mechanism, it is believed that the size and shape of the emulsion polymer in the condensation polymer matrix can be affected by the time of the addition. Also, particular chemical interaction between emulsion polymers and condensation polymers are affected by time of addition, and they, in consequence, affect final blend properties. Such use of glycolyzed polymers is preferred in some circumstances, An example of one such circumstance is that the use of glycolyzed polymers in the invention herein allows a novel use for polymer material that would otherwise end up in a waste stream.

When glycolyzed polymers, e.g., polyesters, are utilized in this invention, the glycolysis takes place rapidly in the presence of a glycol. Glycolysis temperatures can range from about 200° C. to about 300° C., preferably from 240 to 280° C. The glycols that can be used for this process are set out previously in the list of diols and are preferably ethylene glycol, butane diol, hexane diol and the like. In one embodiment, the glycol comprises from about 10 to about 50% by weight based upon the total weight of the continuous phase, more preferably, from about 10 to about 75% by weight based upon the total weight of the continuous phase, and, still preferably, from about to about 95% by weight of the continuous phase. After glycolysis and addition of the polymer colloid system, the molecular weight of the condensation polymer is normally increased by the addition of high vacuum (e.g., <10 mm of Hg) in order to produce, for example, a high molecular weight polyester.

In a preferred embodiment, the diols that may be utilized in the glycolysis include, but are not limited to, any aliphatic or cycloaliphatic diol having from about 2 to about 10 carbon atoms and mixtures thereof. Preferred diols include ethylene diol, 1,3-trimethylene diol, propylene diol, tripropylene diol, 1,4-butanediol, 1,5-pentanediol, 1,6-hexanediol, 1,7-heptanediol, 1,8-octanediol, 1,9-nonanediol, neopentyl diol, cis- or trans-cyclohexanedimethanol, cis- or trans-2,2,4,4-tetramethyl-1,3-cyclobutanediol, diethylene diol, 2,2,4-trimethyl-1,3-pentanediol, 2-methyl-1,3-propanediol, 2-methyl-1,3-pentanediol, or mixtures thereof, more preferred diols include ethylene diol, propylene diol, tripropylene diol, 1,4-butanediol, diethylene diol, neopentyl diol, cis and trans-cyclohexanedimethanol and mixtures thereof; even more preferred diols include neopentyl diol, ethylene diol, cis or trans cyclohexanedimethanol, 1,4 butanediol, or a mixture thereof.

In relation to that aspect of the invention relating to glycolyzed polymers, the amount of diol in the continuous phase may comprise from about 25 to about 100% by weight of the continuous phase, from about 50 to about 100%, by weight of the continuous phase, from about 75 to about 100% of the continuous phase, or from about 90 to about 100% by weight of the continuous phase. Alternatively, the polymer colloid system may comprise water with or without diol.

The process of the invention does not require the isolation of the polymer in the polymer colloid system prior to addition to the condensation reaction. Thus, in one embodiment, the present invention overcomes the necessity of preparing a core shell polymer or the necessity of harvesting the polymer from the emulsion. Further, since blending takes place during the condensation polymer preparation, there is no need for a polymer/polymer post blending step that is energy intensive, expensive and often leads to the reduction of the molecular weight of the condensation polymer.

In some instances it may be preferable to utilize a polymer colloid system comprising a core shell polymer in the condensation polymerization. For example, when core shell polymers are utilized herein, transparent blends can be produced. Such blends may be obtained by coordinating or, more preferably, closely matching the refractive indices of the core shell polymer with that of the condensation polymer matrix. Such techniques are described generally in U.S. Pat. No. 5,409,967, the disclosure of which is incorporated herein by this reference in its entirety.

In a preferred embodiment, the reaction medium in which the polymer colloid systems of the invention are introduced forms polyester polymers. The term polyester, as used herein, refers to any unit-type of polyester falling within the scope of the polyester portion of the blend, including, but not limited to, homopolyesters and copolyesters (two or more types of acid and/or diol residues of monomeric units). The polyesters of the present invention comprise an acid residue and a diol residue. The acid residues of the polyesters of the present invention total 100 mol % and the diol residues of the polyesters of the present invention total 100 mol %. It should be understood that use of the corresponding derivatives, specifically acid anhydrides, esters and acid chlorides of these acids is included throughout the application in the term "acid residue." In addition to the acid residue and the diol residue, the polyester may comprise other modifying residues. These modifying residues include, but are not limited to, a diamine, which would result in a polyester/amide.

The polyesters preferably comprise residues of dicarboxylic acids or esters, including, but not limited to, aromatic dicarboxylic acid or ester residues, preferably having from 8 to 14 carbon atoms, aliphatic dicarboxylic acid or ester residues, preferably having from 4 to 12 carbon atoms, or cycloaliphatic dicarboxylic acid or ester residues, preferably having from 8 to 12 carbon atoms. The acid or ester residue that comprise the acid moiety of the polyester preferably include residues of phthalic acid; terephthalic acid; naphthalenedicarboxylic acid; isophthalic acid; cyclohexanediacetic acid; diphenyl 4,4'-dicarboxylic acid; succinic acid: glutaric acid; adipic acid; fumaric acid; azelaic acid; resorcinoldicetic acid; didiolic acid; 4,4'-oxybis (benzoic) acid; biphenyldicarboxylic acid; 1,12-dodecanedicarboxylic acid; 4,4'-sulfonyldibenzoic acid; 4,4'-methyldibenzoic acid; trans 4,4'-stilbenedicarboxylic acid; 1,2-, 1,3-, and 1,4-cyclohexanedicarboxylic acids; and mixtures thereof. The polyester may be prepared from one or more of the above dicarboxylic acids.

Preferred examples of dicarboxylic acids or derivatives used to prepare the polyester are terephthalic acid or ester and 2,6-napthalenedicarboxylic acid or ester, succinic, isophthalic, glutaric, adipic acid or ester. Other naphthalenedicarboxylic acids or their esters may also be used. These include the 1,2-; 1,3-; 1,4-; 1,5-; 1,6-; 1,7-; 1,8-; 2,3-; 2,4-; 2,5-; 2,6-; 2,7-; and 2,8-naphthalenedicarboxylic acids, and mixtures thereof. Even more preferred is the 2,6-napthalenedicarboxylic acid as the modifying acid.

The diol component of the polyester comprises residues of diols preferably selected from cycloaliphatic diols preferably having from 6 to 20 carbon atoms or aliphatic diols preferably having from 2 to 20 carbon atoms. Examples of such diols include ethylene diol, diethylene diol, triethylene diol, neopentyl diol, 1,4 butanediol, 1,6 hexanediol 1,4-cyclohexanedimethanol, 1,3-propanediol, 1,10-decanediol, 2,2,4,4,-tetramethyl-1,3-cyclobutanediol, 3-methyl-2,4-pentanediol, 2-methyl-1,4-pentanediol, 2,2,4-trimethyl-1,3-pentanediol, 2-ethyl-1-1,3-hexanediol, 2,2-diethyl-1,3-propanediol, 1,3-hexanediol, 1,4-bis-(hydroxyethoxy) benzene, 2,2-bis-(4-hydroxycyclohexyl)-propane, 2,4-dihydroxy-1,1,3,3-tetramethylcyclobutaine, 2,2-bis-(3-hydroxyethoxyphenyl)propane, 2,2-bis-(4-hydroxypropoxyphenyl)propane and mixtures thereof. The diol component is more preferably selected from ethylene diol, 1,4-butanediol, neopentyl diol, cyclohexanedimethanol, diethylene diol and mixtures thereof. The diols may be modified with up to about 50 mol % and more preferably up to about 20 mol % of any of the other diols disclosed herein.

In one embodiment, it is preferred that the polyesters of the invention are essentially linear. However, these polyesters may also preferably be modified with low levels of one or more branching agents. A branching agent is herein defined as a molecule that has at least three functional groups that can participate in a polyester forming reaction, such as hydroxyl, carboxylic acid, carboxylic ester, phosphorous-based ester (potentially trifunctional) and anhydride (difunctional).

Branching agents useful in preparing the polyester of the invention include, but are not limited to glycerol, pentaerythritol, trimellitic anhydride, pyromellitic dianhydride, tartaric acid, and mixtures thereof. If branching agents are used in the condensation reaction, a preferred range for the branching agent is from 0.1 to 2.0 weight %, more preferably from about 0.2 to 1.0 weight %, based on the total weight of the polyester.

Addition of branching agents at low levels does not have a significant detrimental effect on the physical properties of the polyester and provides additional melt strength which can be very useful in film extruding operations. High levels of branching agents incorporated in the copolyesters result in copolyesters with poor physical properties, for example low elongation.

The polymers of the invention may be buffered. Buffers can be utilized to control the formation of diethylene glycol, among other uses. Preferred buffers include, sodium acetate, potassium acetate, lithium acetate, sodium phosphate monobasic, potassium phosphate dibasic and sodium carbonate. Buffering agents are useful to limit the amount of acidic species which, in turn causes dehydration of the diols to give ether diol. Accordingly, it can be desirable to limit such acid species through the use of buffering agents.

An agent comprising one or more ion-containing monomers may be added to increase the melt viscosity of the polyesters. The ion-containing monomers useful in the invention, include, but are not limited to alkaline earth metal salts of sulfisophthalic acid or a derivative thereof The preferred weight percentage for ion-containing monomers is from about 0.3 to 5.0 mole %, preferably from about 0.3 to 3.0 mole %. The ion containing monomers also increase the melt viscosity of the polyesters and do not reduce the elongation of the films to substantially low levels.

The homo or copolyesters of the invention are preferably prepared in reaction carried out using diols and diacids (or diesters or anhydrides) at temperatures from about 150° C. to about 300° C. in the presence of polycondensation catalysts, including, but not limited to, titanium tetrachloride, titanium tetraisopropoxide, manganese diacetate, antimony oxide, antimony triacetate, dibutyl tin diacetate, zinc chloride, or a mixture thereof. The catalysts are typically employed in amounts between 10 to 1000 ppm, based on the total weight of the reactants. The final stage of the reaction is generally conducted under high vacuum (<10 mm of Hg) in order to produce a high molecular weight polyester.

The invention also relates to the modification, as discussed herein, of high molecular weight homo or copolyesters prepared by a method comprising the following steps:

(I) combining the diols and diacids as described herein, with a catalyst system, wherein the catalyst comprises Mn, Sb, Ti and other similar metallic species;

(II) in a first stage, heating said reaction mixture at from 190° C. and 220° C., at or slightly above atmospheric pressure; and (III) in a second stage adding a phosphorous based additive, heating the reaction mixture between 220° C. and 290° C. under a reduced pressure of 0.05 to 2.00 mm of Hg.

These polyesters are best prepared with one of the above named catalyst systems in the presence of a phosphorous based additive. The preferred concentration of catalyst in the reaction is about 5 to about 220 ppm, with the most preferred concentration being about 20 to about 200 ppm. This reaction is best carried out in the two stages as described above.

In another embodiment of the invention, a polycarbonate may be modified by introduction of the polymer colloid system into the reaction medium. The polycarbonates that may be modified, include, but are not limited to, homopolymers, copolymers and mixtures thereof that are prepared by reacting a dihydric phenol with a carbonate precursor. The dihydric phenols which may be used to produce the carbonate, include, but are not limited to bisphenol-A, (2,2-bis(4-hydroxyphenyl)propane), bis(4-hydroxyphenyl)methane, 2,2-bis(4-hydroxy-3-methylphenyl)propane, 4,4-bis(4-hydroxyphenyl heptane), 2,2-(3,5,3',5'-tetrachloro-4,4'-dihydroxydiphenyl)propane, 2,2-(3,5,3',5'-tetrabromo-4,4'dihydroxydiphenyl)propane, (3,3'-dichloro-4,4'-dihydroxydiphenyl) methane, and mixtures thereof. Branching agents useful in preparing the polycarbonate of the invention include, but are not limited to glycerol, pentaerythritol, trimellitic anhydride, pyromellitic dianhydride, tartaric acid, and mixtures thereof. If branching agents are used in the condensation reaction, a preferred range for the branching agent is from 0.1 to 2.0 weight %, more preferably from about 0.2 to 1.0 weight %, based on the total weight of the polyester.

In another embodiment of the invention, the thermoplastic condensation polymer to be modified by introduction of the polymer colloid system may comprise a polyurethane. The polyurethane that may be modified comprises residues of a diol or diols and residues of a di-isocyanante or di-isocyanates. The diol residues of the polyurethane may be derived from diols including but not limited to, 1,3-cyclobutanediol, 1,3-cyclopentanediol, 1,2-cyclohexanediol, 1,3-cyclohexanediol, 1,4-cyclohexanediol, 2-cyclohexane-1,4-diol, 2-methyl-1,4-cyclohexanediol, 2-ethyl-1,4 cyclohexanediol, 1,3-cycloheptanediol, 1,4 cycloheptanediol, 2-methyl-1,4 cycloheptanediol, 4-methyl-1,3-cycloheptanediol, 1,3-cyclooctanediol, 1,4 cyclooctanediol, 1,5 cyclooctanediol, 5-methyl-1,4-cyclooctanediol, 5-ethyl-1,4-cyclooctanediol, 5-propyl-1,4 cyclooctanediol, 5-butyl , 1,4-cyclooctanediol, 5-hexyl-1,4-cyclooctanediol, 5-heptyl-1,4-cyclooctanediol, 5-octyl-1,4 cyclootanediol, 4,4' methylenebis(cyclohexanol), 4,4'-methylenebis(2-methylcyclohexanol), 3,3'-methylenebis (cyclohexanol), 4,4' ethylenebis(cyclohexanol), 4,4'propylenebis(cyclohexanol), 4,4' butylenebis (cyclohexanol), 4,4' isopropylidenebis(cyclohexanol), 4,4' isobutylenebis(cyclohexanol), 4,4' dihydroxydicyclohexyl, 4,4' carbonylbis(cyclohexanol), 3,3'-carbonylbis (cyclohexanol), 4,4'sulfonylbis(cyclohexanol), 4,4'-oxybis (cyclohexanol), and mixtures thereof.

The polyurethanes of the invention can be prepared using any known methods for bringing together, in the presence or absence of solvents, polyisocyanates, extenders, and optionally, high molecular weight polyols. This includes manual or mechanical mixing means including casting, reaction extrusion, reaction injection molding and related processes. Typical preparative methods useful in the instant invention are disclosed in U.S. Pat. Nos. 4,376,834 and 4,567,236, incorporated herein by reference, whose disclosures relate to polyurethane plastic forming ingredients and preparative procedures.

The mixing of the reactants may be carried out at ambient temperature, i.e at a temperature from 20° C. to 25° C. The resulting mixture is preferably heated to a temperature from 40° C. to 130° C., more preferably from 50° C. to 100° C.; preferably one or more of the reactants is heated to a temperature within these ranges before admixing.

A catalyst may optionally be included in the reaction mixture that is used to prepare the polyurethanes. Any of the catalysts conventionally employed in the art to catalyze the reaction of an isocyanate with a reactive hydrogen containing compound may be used for this purpose. Suitable catalysts are disclosed in U.S. Pat. No. 4,202,957 at column 5, lines 45 to 67, incorporated herein by this reference. The amount of catalysts used is preferably within the range of about 0.02 to 2.0 percent by weight, based on the total weight of the reactants. In a particular embodiment of the one-shot procedure, the reaction is carried out on a continuous basis using apparatus and procedures such as that disclosed in U.S. Pat. No. 3,642,964.

The polyurethanes of this invention include both thermoplastic injection-moldable and thermoset resins. The thermoplastic resins are obtained by employing substantially difunctional polyisocyanates and difunctional extenders, and a polyol having a functionality preferably not exceeding 4, although polyols having higher functionalities may be employed where the weigh proportion used in a low range. As will be recognized by one skilled in the art, this limit will vary according to the nature of the polyol, the molecular weight of the polyol, and the amount of polyol used. In general, the higher the molecular weight of the polyol, the higher the functionality which can be employed without losing the thermoplastic properties in the polyurethane product.

The di-isocyanante residue may be derived from di-isocyanates, including, but not limited to methylenebis (phenyl isocyanate) including the 4,4'-isomer, the 2,4' isomer and mixtures thereof, m-and p-phenylene diisocyanates, chlorophenylene diisocyanates, α,β-xylene diisocyanate, 2,4-and 2,6-toluene diisocyanates and mixtures of these latter two isomers, tolidine diisocyanate, hexamethylene diisocyanate, 1,5-naphthalene diisocyante, isophorone diisocyanate and the like, cycloaliphatic diisocyanates such as methylenebis(cyclohexyl isocyanate) including the 4,4' isomer, the 2,4' isomer and mixtures thereof, and all the geometric isomers thereof including trans/trans, cis/trans, cis/cis and mixtures thereof, cyclohexylene diisocyanantes (1,2, 1,3 or 1,4-), 1-methyl-2,5-cyclohexylene diisocyanate, 1-methyl-2,4 cyclohexylene diisocyante, 1-methyl-2,6-cyclohexyl diisocyanate, 4,4'-isopropylidenebis(cyclohexyl isocyanate), 4,4'-diisocyanatodicyclohexyl and all geometric isomers and mixtures thereof. Also included are the modified forms of methylenebis(phenylisocyanate). By the latter are meant those forms of methylenebis(phenyl isocyanate) which have been treated to render them stable liquids at ambient temperature. Such products include those which have been reacted with a minor amount (up to about 0.2 equivalents per equivalent of polyisocyanate) of an aliphatic diol or a mixture of aliphatic diols such as the modified methylenebis(phenyl isocyanates) described in U.S. Pat. Nos. 3,394,164; 3,644,457; 3,883,571; 4,031,026; 4,115,429; 4,118,411; and 4,299,347.

The modified methylenebis(phenyl isocyanates) also include those which have been treated so as to convert a minor proportion of the diisocyanate to the corresponding carbodiimide which then interacts with further diisocyanate to form the aeration-imine groups, the resulting product being a stable liquid at ambient temperatures as described, for example in U.S. Pat. No. 3,384,653. Mixtures of any of the above-named polyisocyanates can be employed if desired. Further in the case of the preparation of those polyurethanes of the invention which are thermoset, it is possible to introduce into the polyisocyanate component employed in the reaction, minor amounts (up to about 30 percent by weight) of polymethylene polyphenyl polyisocyanates. The latter are mixtures containing from about 20 to about 90 percent by weight of methylenebis(phenyl isocyanate) the remainder of the mixture being polymethylene polyphenyl polyisocyanates of functionality higher than about 2.0. Such polyiscoyanates and methods for their preparation are well known in the art; see for example, U.S. Pat. Nos. 2,683,730; 2,950,263; 3,012,008 and 3,097,191. Branching agents useful in preparing the polyurethane of the invention include, but are not limited to glycerol, pentaerythritol, trimellitic anhydride, pyromellitic dianhydride, tartaric acid, and mixtures thereof. If branching agents are used in the condensation reaction, a preferred range for the branching agent is from 0.1 to 2.0 weight %, more preferably from about 0.2 to 1.0 weight %, based on the total weight of the polymer.

When the condensation polymer is a polyurethane and the polymer colloid system is a rubber component consisting of isoprene, chloroprene, butadiene, SBR (styrene/butadiene rubber), isobutene, isoprene or EPDM, the resulting condensation polymer/first polymer blend preferably has an equilibrium water absorption of less than about 10% by weight.

Other ingredients may optionally be added to the compositions of the present invention to enhance the performance properties of the condensation polymer/latex polymer matrix. For example, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, reinforcing agents, mixtures thereof, and the like, can be included herein. All of these additives and the use thereof are well known in the art. Any of these compounds can be used so long as they do not hinder the present invention from accomplishing its objects.

In a particularly preferred embodiment relating to the addition of reinforcing agents to the compositions of the present invention, glass fibers may be added to the condensation polymer compositions to provide particular advantages to the resulting compositions. Glass fibers that are preferred in the present invention conventionally have an average standard diameter of greater than about 5 microns, with a range of about 10 to 20 microns. The length of the glass filaments whether or not they are bundled into fibers, and whether the fibers are further bundled into yams, ropes or rovings, and the like, are not critical to this invention. However, for the purpose of preparing the present compositions, it is preferable to use filamentous glass in the form of chopped strands of from about 1.5 mm to about 10 mm long, and preferably less than about 6 mm long. In the pellets and molded articles of the compositions, even shorter lengths will be encountered, because during compounding, considerable fragmentation occurs. This is, however, desirable because the best properties are exhibited for injection molded articles where the filament lengths are between about 0.03 mm and about 1 mm. Especially preferred are glass fibers having an average standard diameter in the range of greater than 5, preferably 5 to 14, and the average filament length dispersed in the molded articles being between 0.15 and 0.4 mm. Consequently, glass filaments are dispersed uniformly and the molded articles exhibit uniform and balanced mechanical properties, especially surface smoothness.

The amount of the glass fibers can vary broadly from about 10 to about 50% by weight, and most preferably about 10 to about 40% by weight, based on the total polymer composition. These glass fibers are typically conventionally sized with coupling agents, such as aminosilanes and epoxysilanes and titanates, and adhesion promoters such as epoxies, urethanes, cellulosics, starch, cyanurates, and the like.

In one embodiment, when the glass fiber is present in the polymer molding composition, the polymer is preferably from about 70 to about 85% by weight of the total composition based on the total weight percentages of the first and second polymers equaling 100%. Preferably, the polymer in the polymer molding composition comprises polyester.

Examples of other reinforcing agents that are useful in addition to glass fibers, include, but are not limited to, carbon fibers, mica, clay, talc, wollastonite, calcium carbonate or a combination thereof. The polymer compositions of the invention may be reinforced with a mixture of glass and other reinforcing agents as described above, such as mica or talc, and/or with other additives.

In accordance with the invention herein, the polymer colloid system and glass fibers, as well as other reinforcing agents, may be introduced into the condensation polymerization reaction at various stages of the process. In a particularly preferred embodiment of the invention herein, the glass fibers are added directly to the condensation polymerization reaction. Since the glass fibers can be sufficiently blended during this stage, there is no need for a post-blending step, such as extrusion, to incorporate the glass fibers into the compositions. This is particularly advantageous to the present invention because a post-blending step is energy intensive, expensive and may often cause a reduction in the molecular weight of the condensation polymer.

End-use applications for the compositions of the condensation polymers produced according to the instant invention include impact-modified polymers, elastomers, high barrier films and coatings, improved barrier polymers, and polymers having improved mechanical properties, such as improved tensile strength, improved elongation at break, better weathering properties, improved heat deflection temperatures and improved flexural strength. Other end-use applications include engineering resins, coatings, containers for barrier applications and molding plastics. In addition, powder coatings may be produced from the modified condensation polymers produced according to the invention. The polymers produced by this invention are useful for thermoplastic engineering resins, elastomers, films, sheets and container plastics.

In a further, still preferred, embodiment, an impact modified polyester is prepared comprising a core shell or a non core shell first polymer derived from a polymer colloid system. In another preferred embodiment, a hydroxyl functionalized polyester coating is prepared comprising a core shell or a non core shell first polymer derived from a polymer colloid system.

In another embodiment, a condensation polymer which is transparent or semi-transparent is formed. As noted previously, such polymers are preferably formed by closely matching the refractive index of a polymer utilized as the first polymer with the refractive index of the condensation polymer matrix.

In another embodiment of the invention, a modified condensation polymer, including, but not limited to, an impact modified plastic, is produced from a polymer colloid system comprising first polymers which are core shell or non core shell polymers, and a condensation polymer, The first polymer of the polymer colloid system in this embodiment has a Tg of less than 40° C., while the condensation polymer has a Tg of greater than 40° C. The impact modified plastic is preferably prepared from a polymer colloid system comprising a first polymer which comprises residues of 2-ethyl hexyl acrylate, butyl acrylate, isoprene, butadiene, lauryl acrylate, acrylonitrile, vinylidene chloride, or a mixture thereof.

In another embodiment of the invention, a modified condensation polymer, including but not limited to, a thermoplastic elastomer, is produced from a polymer colloid system comprising first polymers which are non core shell polymers. The first polymer of the polymer colloid in this embodiment has a Tg greater than 40° C., and the condensation polymer has a Tg less than 40° C. Preferably, the condensation polymer will have a Tg of less than 0° C. and essentially no crystallinity, even more preferably, the condensation polymer will have a Tg of less than −20° C. and will have essentially no crystallinity. In a further embodiment, both the first polymer and the condensation polymer will have Tg's of less than 40° C. The thermoplastic elastomer is preferably prepared from a polymer colloid system comprising a first polymer comprising residues of vinyl chloride, styrene, α-methyl styrene, methyl methacrylate, vinyl naphthalene, isobornyl methacrylate or a mixture thereof.

In another embodiment of the invention, a modified condensation polymer, including but not limited to, a thermoplastic elastomer, is produced from a polymer colloid system comprising a first polymer which is a core shell polymer. The polymer colloid in this embodiment has a Tg greater than about 40° C., and the condensation polymer has a Tg less than about 40° C. Preferably, the condensation polymer will have a Tg of less than 0° C. and essentially no crystallinity, even more preferably, the condensation polymer will have a Tg of less than −20° C. and will have essentially no crystallinity. In a further embodiment, both the first polymer and the condensation polymer will have Tg's of less than 40° C. The thermoplastic elastomer is preferably prepared from a polymer colloid system comprising a first polymer of a core shell type.

Elastomers are finding increasing utility, in particular thermoplastic elastomers (TPE's) that are elastomeric at use temperature, but can be processed as a plastic (e.g., injection molding, extruded) at appropriate temperatures. In a further embodiment of this invention, an elastomer may be prepared according to the process of the invention. For example, a condensation polymer that is amorphous and has a low Tg may be a viscous fluid that is not useful as a plastic or elastomer. This low Tg viscous polymer may be used to make an elastomer by adding a second polymer, in the form of a polymer colloid system, which acts as a physical cross-linker and is a tie-point for the viscous polymer chains. A phase separated polymer blend will result that has elastomeric properties.

EXAMPLES

The following examples are put forth so as to provide those of ordinary skill in the art with a complete disclosure and description of how the compositions of matter and methods claimed herein are made and evaluated, and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are by weight, temperature is in °C. or is at room temperature and pressure is at or near atmospheric.

The materials and testing procedures used for the results shown herein are as follows:

Inherent viscosity (Ih.V.) was determined at 25° C. with a 0.50 gram sample in 100 mL of 60/40 by weight solution of phenol/tetrachloroethane.

Molecular weight distributions were determined by gel permeation chromatography (GPC). Solutions were made by dissolving about 4 mg of polymer in a 30/70 by weight solution of hexafluoroisopropanol/methylene chloride containing 10% by volume toluene as a flow rate marker. The system was calibrated using a series of narrow molecular weight polystyrene standards. The molecular weights were reported in absolute molecular weight values determined from a set of Mark-Houwink constants that relate PET to polystyrene.

Thermal transitions were determined by differential scanning calorimetry (DSC) on a DuPont instruments 2200 DSC. Percent crystallinity was also determined by DSC. DSC was performed using a scan rate of 20° C./minute after the sample was heated above its melting temperature and rapidly quenched below its glass transition temperature.

Films were prepared by compression molding the dried polymer. Drying was accomplished in a 120° C. vacuum oven (20 mm Hg) overnight. The dried polymers were compression molded at Tm+30 to 50° C. into a 6"×6" film by pressing between two metal plates with a 15 mil shim on a Pasadena Hydraulics Inc. press. Pressure was gradually applied for 2 minutes before ultimately reaching 15,000 ran force pounds and holding for 1 minute. After compression molding, the films were quickly dipped into an ice bath to quench. Instrumented impact testing of the films was done according to ASTM method D3763, High Speed Puncture Properties of Plastics Using Load and Displacement Sensors. Testing was done at 23° C. on a Ceast Fractovic testing machine. Film thickness ranged from 0.33–0.38 mm. Films were placed over a hole with a 76 mm insert diameter while the films were hit with a 0.5" diameter striker with a velocity of 11.1 ft/s. Failure was classified as brittle if the film shattered or fractured into pieces, while a ductile failure was reported if a hole was created in the film.

Transmission Electron Microscopy: Thin cross sections were made on a Cryo-Ultra microtome operated at –105° C. The sections were examined in a Philips CM12 TEM operated at 80 kV. The contrast was natural without the use of stains.

Optical Microscopy: Thin cross sections were made at –60° C. and examined using a Zeiss light microscope.

The examples set out below are grouped generally according to the headings preceeding the groupings.

Example Relating to Diol Latex Compositions

Example 1

To a 1 L jacketed reaction kettle equipped with a condenser, nitrogen purge, and stirrer, 300 g of ethylene diol and 2.33 g of Hitenol A-10, a polymerizable polyoxyethylene alkyl phenyl ether ammonium sulfate, manufactured by DKS International, were added. The contents of the reactor were heated to 80° C. In a separate 500 ml flask, a monomer/surfactant mix of 118.75 g 2-ethylhexylacrylate, 6.25 g of trimethylolpropane-triacrylate and 3.60 g of Hitenol A-10 was prepared. To the heated reactor, 12.85 g of the monomer/surfactant mix was added. After allowing the contents of the reactor to re-equilibrate, 3.0 g of sodium persulfate dissolved in 15 g of water was added to the reactor. After a few minutes, the reactor appearance changed from clear to a bluish-white tint indicating the formation of small particles. The remaining monomer mix was fed into the reactor over a period of 39 minutes. At the same time the monomer was being added to the reactor, 1.50 g of sodium persulfate dissolved in 50 g of water was fed into the reactor. After all the monomer was added, the reaction was held at 80° C. for an additional hour at which point the reactor was cooled to room temperature.

The resulting latex w as filtered through a 100 mesh screen. The dried scrap collected on the screen was 0.815 g. The latex was evaluated for the solids content using a CEM microwave drier and contained 28.1% solids. The effective diameter as measured by dynamic light scattering was 181 nm.

Example 2

To a 1 L jacketed reaction kettle equipped with a condenser, nitrogen purge, and stirrer, 300 g of ethylene diol and 2.3 g of Hitenol A-10 were added. The contents of the reactor were heated to 70° C. In a separate 500 ml flask, a monomer/surfactant mix of 118.75 g 2-ethylhexylacrylate, 6.25 g of trimethylol-propanetriacrylate and 3.60 g of Hitenol A-10 was prepared. To the heated reactor, 12.85 g of the monomer/surfactant mix was added. After allowing the contents of the reactor to re-equilibrate, 3.0 g of azobisisovaleric acid slurried in 15 g of ethylene diol was added to the reactor. After a few minutes, the reactor appearance changed from clear to a bluish-white tint indicating the formation of small particles. The remaining monomer mix was fed into the reactor over a period of 58 minutes. After all the monomer was added the reaction was held at 70° C. for an additional hour and a half at which point the reactor was cooled to room temperature.

The resulting latex was filtered through a 100 mesh screen. The dried scrap collected on the screen was 0.741 g. The latex was evaluated for the solids content using a CEM microwave drier and contained 27.6% solids. The effective diameter as measured by dynamic light scattering was 122 nm.

Example 3

To a 1 L jacketed reaction kettle equipped with a condenser, nitrogen purge, and stirrer, 272 g of ethylene diol, 0.839 g of sodium formaldehyde sulfoxylate and 5.04 g of Hitenol A-10 were added. The contents of the reactor were heated to 65° C. In a separate 500 ml flask, a monomer/surfactant mix of 132.81 g 2-ethylhexylacrylate, 6.99 g of trimethylolpropanetriacrylate, 35.66 g of ethylene diol and 2.88 g of Hitenol A-10 was prepared. To the heated reactor, 17.8 g of the monomer/surfactant mix was added. After allowing the contents of the reactor to re-equilibrate, 0.777 g of 90 wt. % t-butyl hydroperoxide dissolved in 15 g of ethylene diol was added to the reactor. After a few minutes, the reactor appearance changed from clear to a bluish-white tint indicating the formation of small particles. The remaining monomer mix was fed into the reactor over a period of 58 minutes. After all the monomer was added, the reaction was held at 65° C. for an additional one half hour at which point the reactor was cooled to room temperature.

The resulting latex was filtered through a 100 mesh screen. The dried scrap collected on the screen was 0.837 g. The latex was evaluated for the solids content using a CEM microwave drier and contained 25.2% solids. The effective diameter as measured by dynamic light scattering was 126 nm.

Example 4

To a 1 L jacketed reaction kettle equipped with a condenser, nitrogen purge, and stirrer, 379.25 g of ethylene diol and 24.65 g of Disponil FES 77, an alkyl ethoxylate sodium sulfate, (30% active in water) manufactured by Henkel were added. The contents of the reactor were heated to 65° C. In a separate 500 ml flask, a monomer/surfactant mix of 191.55 g 2-ethylhexylacrylate, 22.54 g of styrene, 11.27 g of allyl methacrylate, 47.89 g of ethylene diol and 14.09 g of Disponil FES77 was prepared. To the heated reactor, 28.7 g of the monomer/surfactant mix was added. After allowing the contents of the reactor to re-equilibrate, 0.751 g of 90 wt. % t-butyl hydroperoxide (t-BHP) dissolved in 11 g of ethylene diol was added to the reactor followed by 0.255 g of sodium formaldehyde sulfoxylate (SFS) dissolved in 11 g of distilled water. After a few minutes, the reactor appearance changed from clear to a bluish-white tint indicating the formation of small particles. The remaining monomer mix was fed into the reactor over a period of 195 minutes. During the same time period, 0.901 g of SFS dissolved in 28 g of distilled water was fed into the reactor. Also, 0.501 g of 90 wt. % t-BHP was dissolved in 56 g of ethylene diol was fed into the reactor. After all the monomer was added, the reaction was held at 65° C. for an additional one half hour at which point the reactor was cooled to room temperature.

The resulting emulsion was filtered through a 100-mesh screen. The emulsion contained 27.5% solids and the particle size was 184 nm as measured by dynamic light scattering.

Example 5

To a 1 L jacketed reaction kettle equipped with a condenser, nitrogen purge, and stirrer, 396.01 g of ethylene diol and 7/89 g of Hitenol HS-20, polymerizable polyoxyethylene alkyl phenyl ether ammonium sulfate, manufactured by DKS International, were added. The contents of the reactor were heated to 65° C. In a separate 500 ml flask, a monomer/surfactant mix of 112.68 g 2-ethylhexylacrylate, 112.68 g of vinyl acetate, 57.46 g of ethylene diol and 4.51 g of Hitenol HS-20 was prepared. To the heated reactor, 28.7 g of the monomer/surfactant mix was added. After allowing the contents of the reactor to re-equilibrate, 0.751 g of 90 wt. % t-butyl hydroperoxide (t-BHP) dissolved in 11 g of ethylene diol was added to the reactor followed by 0.255 g sodium formaldehyde sulfoxylate (SFS) dissolved in 11 g of distilledwater. After a few minutes, the reactor appearance changed from clear to a bluish-white tint indicating the formation of small particles. The remaining monomer mix was fed into the reactor over a period of 195 minutes. During the same time period, 0.901 g of SFS dissolved in 28 g of distilled water was fed into the reactor. Also, 0.501 g of 90 wt. % t-BHP dissolved in 56 g of ethylene diol was fed into the reactor. After all the monomer was added, the reaction was held at 65° C. for an additional one half hour at which point the reactor was cooled to room temperature.

The resulting emulsion was filtered through a 100 mesh screen. The emulsion contained 23.18% solids and the particle size was 114 nm as measured by dynamic light scattering.

Example 6

To a 1 L jacketed reaction kettle equipped with a condenser, nitrogen purge, and stirrer, 396.01 g of ethylene diol and 7.89 g of Hitenol HS-20 were added. The contents of the reactor were heated to 65° C. In a separate 500 ml flask, a monomer/surfactant mix of 169.01 g of n-butylacrylate, 4.507 g of Hitenol HS-20 was prepared. To the heated reactor, 28.7 g of the monomer/surfactant mix was added. After allowing the contents of the reactor to re-equilibrate, 0.751 g of 90 wt. % t-butyl hydroperoxide (t-BHP) dissolved in 11 g of ethylene diol was added to the reactor followed by 0.255 g sodium formaldehyde sulfoxylate (SFS) dissolved in 11 g of distilled water. After a few minutes, the reactor appearance changed from clear to a bluish-white tint indicating the formation of small particles. The remaining monomer mix was fed into the reactor over a period of 195 minutes. During the same time period, 0.901 g of SFS dissolved in 28 g of distilled water was fed into the reactor. Also, 0.501 g of 90 wt. % t-BHP dissolved in 56 g of ethylene diol was fed into the reactor. After all the monomer was added, the reaction was held at 65° C. for an additional one half hour at which point the reactor was cooled to room temperature.

The resulting emulsion was filtered through a 100 mesh screen. The emulsion contained 27.5% of solids and the particle size was 102 nm as measured by dynamic light scattering.

Example 7

To a 1 L jacketed reaction kettle equipped with a condenser, nitrogen purge, and stirrer, 396.01 g of ethylene diol and 7.89 g of Hitenol HS-20 were added. The contents of the reactor were heated to 65° C. In a separate 500 ml flask, a monomer/surfactant mix of 169.01 g 2-ethylhexylacrylate, 45.07 g of methyl methacrylate, 11.27 g of allyl methacrylate, 57.46 g of ethylene diol and 4.51 g of Hitenol HS-20 was prepared. To the heated reactor, 28.7 g of the monomer/surfactant mix was added. After allowing the contents of the reactor to re-equilibrate, 0.71 g of 90 wt. % t-butyl hydroperoxide (t-BHP) dissolved in 11 g of ethylene diol was added to the reactor followed by 0.255 g sodium formaldehyde sulfoxylate (SFS) dissolved in 11 g of distilled water. After a few minutes, the reactor appearance changed from clear to a bluish-white tint indicating the formation of small particles. The remaining monomer mix was fed into the reactor over a period of 195 minutes. During the same time period, 0.901 g of SFS dissolved in 28 g of distilled water was fed into the reactor. Also, 0.501 g of 90 wt. % t-BHP dissolved in 56 g of ethylene diol was fed into the reactor. After all the monomer was added, the reaction was held at 65° C. for an additional one half hour at which point the reactor was cooled to room temperature.

The resulting emulsion was filtered through a 100 mesh screen. The emulsion contained 27.0% solids and the particle size was 140 nm as measured by dynamic light scattering.

Example 8

To a 1 L jacketed reaction kettle equipped with a condenser, nitrogen purge, and stirrer, 267.5 g of ethylene diol and 1.74 g of Hitenol HS-20 were added. The contents of the reactor were heated to 65° C. In a separate 500 ml flask, a monomer/surfactant mix of 295.65 g 2-ethylhexylacrylate, 34.78 g of styrene, 17.39 g of allyl methacrylate, 88.70 g of ethylene diol and 6.96 g of Hitenol HS-20 was prepared. To the heated reactor, 44.3 g of the monomer/surfactant mix was added. After allowing the contents of the reactor to re-equilibrate, 1.16 g of 90 wt. % t-butyl hydroperoxide (t-BHP) dissolved in 9 g of ethylene diol was added to the reactor followed by 0.348 g sodium formaldehyde sulfoxylate (SFS) dissolved in 9 g of distilled water. After a few minutes, the reactor appearance changed from clear to a bluish-white tint indicating the formation of small particles. The remaining monomer mix was fed into the reactor over a period of 220 minutes. During the same time period, 1.391 g of SFS dissolved in 22 g of distilled water was fed into the reactor. Also, 0.773 g of 90 wt. % t-BHP dissolved in 44 g of ethylene diol was fed into the reactor. After all the monomer was added, the reaction was held at 65° C. for an additional one half hour at which point the reactor was cooled to room temperature.

The resulting emulsion contained 41.78% solids and the particle size was 337 nm as measured by dynamic light scattering.

Example 9

To a 1 L jacketed reaction kettle equipped with a condenser, nitrogen purge, and stirrer, 267.5 g of ethylene diol, 7.85 g of Hitenol HS-20, 0.0898 g of a 1 wt. % ammonium iron sulfate solution in water and 0.449 g of a 1% solution of ethylenediamine tetraaceticacid in water were added. The contents of the reactor were heated to 65° C. In a separate 500 ml flask, a monomer/surfactant mix of 190.82 g 2-ethylhexylacrylate, 22.45 g of styrene, 11.2 g of allyl methacrylate, 57.25 g of ethylene diol and 4.49 g of Hitenol HS-20 was prepared. To the heated reactor, 28.8 of the monomer/surfactant mix was added. After allowing the contents of the reactor to re-equilibrate, 1.25 g of a 90 wt. % t-butyl hydroperoxide (t-BHP) dissolved in 11 g of ethylene diol was added to the reactor followed by 0.449 g d-isoascorbic acid dissolved in 11 g of ethylene diol. After a few minutes, the reactor appearance changed from clear to a bluish-white tint indicating the formation of small particles. The remaining monomer mix was fed into the reactor over a period of 195 minutes. During the same time period, 1.247 g of d-isoascorbic acid dissolved in 22 g of ethylene diol was fed into the reactor. Also, 0.773 g of 90 wt. % t-BHP dissolved in 44 g of ethylene diol was fed into the reactor. After all the monomer was added, the reaction was held at 65° C. for an additional one half hour at which point the reactor was cooled to room temperature.

The resulting emulsion contained 27% solids and the particle size was 127 nm as measured by dynamic light scattering.

Example 10

To a 1 L jacketed reaction kettle equipped with a condenser, nitrogen purge, and stirrer, 424.7 g of a 75 wt. percent propylene diol/water solution and 7.78 g of Hitenol HS-20 were added. The contents of the reactor were heated to 65° C. In a separate 500 ml flask, a monomer/surfactant mix of 188.9 g 2-ethylhexylacrylate, 22.22 g of styrene, 11.11 g of allyl methacrylate, 56.67 of a 75 wt. percent propylene diol/ water solution and 4.44 g of Hitenol HS-20 was prepared. To the heated reactor, 28.3 g of the monomer/surfactant mix was added. After allowing the contents of the reactor to re-equilibrate, 1.73 g of 90 wt. % t-butyl hydroperoxide (t-BHP) dissolved in 11 g of ethylene diol was added to the reactor followed by 0.23 g sodium formaldehyde sulfoxylate (SFS) dissolved in 11 g of distilled water. After a few minutes, the reactor appearance changed from clear to a bluish-white tint indicating the formation of small particles. The remaining monomer mix was fed into the reactor over a period of 195 minutes. During the same time period, 0.95 g of SFS dissolved in 22 g of distilled water was fed into the reactor. Also, 0.741 g of 90 wt. % t-BHP dissolved in 44 g of ethylene diol was fed into the reactor. After all the monomer was added, the reaction was held at 65° C. for an additional one half hour at which point the reactor was cooled to room temperature.

The resulting emulsion was filtered through a 100 mesh screen. This emulsion contained 27.1% solids and the particle size was 196 nm as measured by dynamic light scattering.

Example 11

To a 1 L jacketed reaction kettle equipped with a condenser, nitrogen purge, and stirrer, 424.7 g of a 50:50 wt. percent propylene diol: Ethylene diol mixture and 7.78 g of Hitenol HS-20 were added. The contents of the reactor were heated to 65° C. In a separate 500 ml flask, a monomer/surfactant mix of 188.9 g 2-ethylhexylacrylate, 22.22 g of styrene, 11.11 g of allyl methacrylate, 56.67 g of a 50:50 wt. percent propylene diol, ethylene diol mixture and 4.44 g of Hitenol HS-20 was prepared. To the heated reactor, 28.3 g of the monomer/surfactant mix was added. After allowing the contents of the reactor to re-equilibrate, 1.73 g of t-butyl hydroperoxide (t-BHP) dissolved in 11 g of ethylene diol was added to the reactor followed by 0.23 g sodium formaldehyde sulfoxylate (SFS) dissolved in 11 g of distilled-water. After a few minutes, the reactor appearance changed from clear to a bluish-white tint indicating the formation of small particles. The remaining monomer mix was fed into the reactor over a period of 195 minutes. During the same time period, 0.95 g of SFS dissolved in 22 g of distilled water was fed into the reactor. Also, 0.741 g of 90 wt. % t-BHP dissolved in 44 g of ethylene diol was fed into the reactor. After all the monomer was added, the reaction was held at 65° C. for an additional one half hour at which point the reactor was cooled to room temperature.

The resulting emulsion was filtered through a 100 mesh screen. This emulsion contained 27.6% solids and the particle size was 332 nm as measured by dynamic light scattering.

Example 12

To a 1 L jacketed reaction kettle equipped with a condenser, nitrogen purge, and stirrer, 394.05 g of a 75 wt. percent diethylene diol water solution and 1.15 g of Hitenol HS-20 were added. The contents of the reactor were heated to 65° C. In a separate 500 ml flask, a monomer/surfactant mix of 195.22 g 2-ethylhexylacrylate, 22.97 g of styrene, 11.48 g of allyl methacrylate, 58.56 g of a 75 wt. percent diethylene diol water solution and 4.59 g of Hitenol HS-20 was prepared. To the heated reactor, 29.3 g of the monomer/surfactant mix was added. After allowing the contents of the reactor to re-equilibrate, 0.984 g of 90 wt. % t-butyl hydroperoxide (t-BHP) dissolved in 11 g of a 75 wt % diethylene diol/water solution was added to the reactor followed by 0.689 g Sodium formaldehyde sulfoxylate (SFS) dissolved in 11 g of distilledwater. After a few minutes, the reactor appearance changed from clear to a bluish-white tint indicating the formation of small particles. The remaining monomer mix was fed into the reactor over a period of 195 minutes. During the same time period, 1.605 g of SFS dissolved in 28 g of distilled water was fed into the reactor. Also, 2.297 g of 90 wt. % t-BHP dissolved in 56 g of a 75 wt % diethylene diol/water solution was fed into the reactor. After all the monomer was added, the reaction was held at 65° C. for an additional one half hour at which point the reactor was cooled to room temperature.

The resulting emulsion was filtered through a 100 mesh screen. This emulsion contained 25.6% solids and the particle size was 302 nm as measured by dynamic light scattering.

Example 13

To a 1 L jacketed reaction kettle equipped with a condenser, nitrogen purge, and stirrer, 394.05 g of a 50:50 wt. percent diethylene diol:ethylene diol mixture and 1.15 g of Hitenol HS-20 were added. The contents of the reactor were heated to 65° C. In a separate 500 ml flask, a monomer/surfactant mix of 195.22 g 2-ethylhexylacrylate, 22.97 g of styrene, 11.48 g of allyl methacrylate, 58.56 g of a 50:50 wt. percent diethylene diol:ethylene diol and 4.59 g of Hitenol HS-20 was prepared. To the heated reactor, 29.3 g of the monomer/surfactant mix was added. After allowing the contents of the reactor to re-equilibrate, 0.984 g of a 70 wt % t-butyl hydroperoxide (t-BHP) dissolved in 11 g of ethylene diol was added to the reactor followed by 0.689 g Sodium formaldehyde sulfoxylate (SFS) dissolved in 11 g of distilledwater. After a few minutes, the reactor appearance changed from clear to a bluish-white tint indicating the formation of small particles. The remaining monomer mix was fed into the reactor over a period of 195 minutes. During the same time period, 1.608 g of SFS dissolved in 28 g of distilled water was fed into the reactor. Also, 2.297 g of a 70 wt % t-BHP dissolved in 56 g of ethylene diol was fed into the reactor. After all the monomer was added the reaction was held at 65° C. for an additional one half hour at which point the reactor was cooled to room temperature.

The resulting emulsion was filtered through a 100 mesh screen, The particle size of the emulsion was 497 nm as measured by dynamic light scattering.

Example 14

To a 1 L jacketed reaction kettle equipped with a condenser, nitrogen purge, and stirrer, 75.70 g of a 50 wt. percent tripropylene diol water solution and 4.49 g of Hitenol HS-20 were added. The contents of the reactor were heated to 65° C. In a separate 500 ml flask, a monomer/surfactant mix of 190.65 g 2-ethylhexylacrylate, 22.43 g of styrene, 11.21 g of allyl methacrylate, 376.94 g of the 50 wt. percent tripropylene diol water solution and 6.73 g of Hitenol HS-20 was prepared. To the heated reactor, 29.3 g of the monomer/surfactant mix was added. After allowing the contents of the reactor to re-equilibrate, 0.984 g of t-butyl hydroperoxide (t-BHP) dissolved in 11 g of 50 wt % tripropylene diol/water solution was added to the reactor followed by 0.689 g sodium formaldehyde sulfoxylate (SFS) dissolved in 11 g of distilledwater. After a few minutes, the reactor appearance changed from clear to white with a bluish-white tint indicating the formation of small particles. The remaining monomer mix was fed into the reactor over a period of 195 minutes. During the same time period, 1.608 g of SFS dissolved in 28 g of distilled water was fed into the reactor. Also, 2.297 g of 70 wt. % t-BHP dissolved in 56 g of 50 wt % tripropylene diol/water solution was fed into the reactor. After all the monomer was added the reaction was held at 65° C. for an additional one half hour at which point the reactor was cooled to room temperature.

The resulting emulsion was filtered through a 100 mesh screen. The particle size of the emulsion was 144 nm as measured by dynamic light scattering.

Example 15

To a 1 L jacketed reaction kettle equipped with a condenser, nitrogen purge, and stirrer, 322.13 g of a 75 wt. percent ethylene diol/ water solution and 26.71 g of Disponil FES 77 surfactant was added. The contents of the reactor were heated to 65° C. In a separate 500 ml flask, a monomer mix of 307.69 g 2-ethylhexylacrylate, 34.19 g of styrene, was prepared. To the heated reactor, 34.19 g of the monomer mix was added. After allowing the contents of the reactor to re-equilibrate, 0.76 g of a 90 wt % t-butyl hydroperoxide (t-BHP) dissolved in 8.8 g of the 75% ethylene diol/water mixture was added to the reactor followed by 0.34 g sodium formaldehyde sulfoxylate (SFS) dissolved in 11 g of distilled water. After a few minutes, the reactor appearance changed from clear to white with a bluish-white tint indicating the formation of small particles. The remaining monomer mix was fed into the reactor over a period of 195 minutes. During the same time period, 1.03 g of SFS and 22.79 g of the Disponil FES77 surfactant dissolved in 22 g of distilled water was fed into the reactor. Also, 0.76 g of 90 wt. % t-BHP dissolved in 44 g of 75% ethylene diol/water was fed into the reactor. After all the monomer was added the reaction was held at 65° C. for an additional one half hour at which point the reactor was cooled to room temperature.

The resulting emulsion was filtered through a 100 mesh screen. This emulsion contained 45% solids and the particle size was 63 nm as measured by dynamic light scattering.

Example 16

To a 1 L jacketed reaction kettle equipped with a condenser, nitrogen purge, and stirrer, 395.38 g of a 50 wt. percent cyclohexanedimethanol (CHDM) water solution and 5.70 g of Hitenol HS-20 were added. The contents of the reactor were heated to 65° C. In a separate 500 ml flask, a monomer/surfactant mix of 193.73 g 2-ethylhexylacrylate, 34.19 g of styrene, 58.12 g of the 50 wt. percent CHDM:water solution and 4.56 g of Hitenol HS-20 was prepared. To the heated reactor, 29.1 g of the monomer/surfactant mix was added. After allowing the contents of the reactor to re-equilibrate, 0.51 g a 90 wt % of t-butyl hydroperoxide (t-BHP) dissolved in 11 g of 50% wt % CHDM/Water solution was added to the reactor followed by 0.0.23 g sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 195 minutes. During the same time period, 0.68 g of SFS dissolved in 28 g of distilled water was fed into the reactor. Also, 0.50 g of 90 wt. % t-BHP dissolved in 56 g of 50% wt %CHDM/Water solution was fed into the reactor. After all the monomer was added the reaction was held at 65° C. for an additional one half hour at which point the reactor was cooled to room temperature.

The resulting emulsion was filtered through a 100 mesh screen. The particle size of the emulsion was 225 nm as measured by dynamic light scattering.

Example 17

To a 1 L jacketed reaction kettle equipped with a condenser, nitrogen purge, and stirrer, 395.38 g of a 25 wt. percent cyclohexanedimethanol (CHDM) in ethylene diol and 5.70 g of Hitenol HS-20 were added. The contents of the reactor were heated to 65° C. In a separate 500 ml flask, a monomer/surfactant mix of 193.73 g 2-ethylhexylacrylate, 34.19 g of styrene, 58.12 g of 25 wt % CHDM/EG solution and 4.56 g of Hitenol HS-20 was prepared. To the heated reactor, 29.1 g of the monomer/surfactant mix was added. After allowing the contents of the reactor to re-equilibrate, 0.51 g of a 90 wt % t-butyl hydroperoxide (t-BHP) dissolved in 11 g of 25% CHDM/EG solution was added to the reactor followed by 0.0.23 g Sodium formaldehyde sulfoxylate (SFS) dissolved in 11.2 g of distilledwater. After a few minutes, the reactor appearance changed from clear to white with a bluish-white tint indicating the formation of small particles. The remaining monomer mix was fed into the reactor over a period of 195 minutes. During the same time period, 0.68 g of SFS dissolved in 28 g of distilled water was fed into the reactor. Also, 0.51 grams of 90 wt. % t-BHP dissolved in 56 g of 25% CHDM/EG solution was fed into the reactor. After all the monomer was added the reaction was held at 65° C. for an additional one half hour at which point the reactor was cooled to room temperature.

The resulting emulsion was filtered through a 100 mesh screen. This emulsion contained 28% solids and the particle size was 310 nm as measured by dynamic light scattering.

Example 18

To a 1 L jacketed reaction kettle equipped with a condenser, nitrogen purge, and stirrer, 395.38 g of a 60 wt. percent neopentyl diol (NPG) water solution and 5.70 g of Hitenol HS-20 were added. The contents of the reactor were heated to 65° C. In a separate 500 ml flask, a monomer/surfactant mix of 186.89 g 2-ethylhexylacrylate, 27.35 g of styrene, 6.84 g of allyl methacrylate, 6.84 g of methacrylic acid 58.12 g of the 60 wt. percent NPG/Water solution and 4.56 g of Hitenol HS-20 was prepared. To the heated reactor, 29.1 g of the monomer/surfactant mix was added. After allowing the contents of the reactor to re-equilibrate, 0.51 g of t-butyl hydroperoxide (t-BHP) dissolved in 11 g of 50% NPG/Water solution was added to the reactor followed by 0.0.23 g sodium formaldehyde sulfoxylate (SFS) dissolved in 11.2 g of distilledwater. After a few minutes, the reactor appearance changed from clear to white with a bluish-white tint indicating the formation of small particles. The remaining monomer mix was fed into the reactor over a period of 195 minutes. During the same time period, 0.68 g of SFS dissolved in 28 g of distilled water was fed into the reactor. Also, 0.51 g of 90 wt. % t-BHP dissolved in 56 g of 60wt % NPG/Water solution was fed into the reactor. After all the monomer was added the reaction was held at 65° C. for an additional one half hour at which point the reactor was cooled to room temperature.

The resulting emulsion was filtered through a 100 mesh screen. The particle size of the emulsion was 691 nm as measured by dynamic light scattering.

Example 19

To a 1L jacketed reaction kettle equipped with a condenser, nitrogen purge, and stirrer, 392.54 g of a 75 wt. percent ethylene diol:water solution and 11.29 g of Tergitol 15-S-40, a secondary alcohol ethoxylate (70wt % in water), manufactured by Union Carbide, were added. The contents of the reactor were heated to 65° C. In a separate 500 ml flask, a monomer/surfactant mix of 203.20 g 2-ethylhexylacrylate, 22.58 g of styrene, 58.64 g of the 75 wt. percent EG:water solution and 6.45 g of Tergitol 15-S-40 was prepared. To the heated reactor, 28.79 g of the monomer/surfactant mix was added. After allowing the contents of the reactor to re-equilibrate, 0.50 g of a 90 wt % t-butyl hydroperoxide (t-BHP) dissolved in 11 g of the 75 wt. % EG:water solution was added to the reactor followed by 0.23 g sodium formaldehyde sulfoxylate (SFS) dissolved in 11.2 g of distilledwater. After a few minutes, the reactor appearance changed from clear to white with a bluish-white tint indicating the formation of small particles. The remaining monomer mix was fed into the reactor over a period of 195 minutes. During the same time period, 0.68 g of SFS dissolved in 28 g of distilled water was fed into the reactor. Also, 0.50 g of 90 wt. % t-BHP dissolved in 56 g of 75% EG:water solution was fed into the reactor. After all the monomer was added the reaction was held at 65° C. for an additional one half hour at which point the reactor was cooled to room temperature.

The resulting emulsion was filtered through a 100 mesh screen. The particle size of the emulsion was 118 nm as measured by dynamic light scattering.

Example 20

To a 1 L jacketed reaction kettle equipped with a condenser, nitrogen purge, and stirrer, 229.91 g of ethylene diol and 3.62 g of Hitenol HS-20 were added and 0.72 g of a 1% ammonium iron (II) sulfate solution in water. The contents of the reactor were heated to 65° C. In a separate 500 ml flask, a monomer/surfactant mix of 65.02 g isoprene, 62.48 g of styrene, and 2.60 g of methacrylic acid was prepared. To the heated reactor, 14.17 g of styrene and 0.29 g of methacrylic acid were added. After allowing the contents of the reactor to re-equilibrate, 0.21 g of 70 wt. % t-butyl hydroperoxide (t-BHP) dissolved in 11 g of EG was added to the reactor followed by 0.14 g sodium formaldehyde sulfoxylate (SFS) dissolved in 11.2 g of distilledwater. After a few minutes, the reactor appearance changed from clear to white with a bluish-white tint indicating the formation of small particles. After allowing the styrene/methacrylic acid to react for 30 minutes, the monomer mix was fed into the reactor over a period of 150 minutes. During the same time period, 0.72 g of SFS dissolved in 52.50 g of distilled water was fed into the reactor. Also, 1.02 g of 70 wt. % t-BHP dissolved in 52.5 g of EG was fed into the reactor. After all the monomer was added the reaction was held at 65° C. for an additional one half hour at which point the reactor was cooled to room temperature.

The resulting emulsion was filtered through a 100 mesh screen. This emulsion contained 18% solids and the particle size was 109 nm as measured by dynamic light scattering.

Example 21

To a 1 L jacketed reaction kettle equipped with a condenser, nitrogen purge, and stirrer, 338.66 g of 1,4-butanediol (1,4-BD) and 127.56 g of water solution and 7.90 g of Hitenol HS-20 were added. The contents of the reactor were heated to 65° C. In a separate 500 ml flask, a monomer/surfactant mix of 191.91 g 2-ethylhexylacrylate, 22.58 g of styrene, 11.29 g allyl methacrylate and 4.52 g of Hitenol HS-20 was prepared. To the heated reactor, 23.03 g of the monomer/surfactant mix was added. After allowing the contents of the reactor to re-equilibrate, 0.65 g of t-butyl hydroperoxide (t-BHP) dissolved in 9.03 g of 1,4-BD was added to the reactor followed by 0.23 g sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 195 minutes. During the same time period, 0.68 g of SFS dissolved in 28 g of distilled water was fed into the reactor. Also, 0.65 g of 90 wt. % t-BHP dissolved in 45.16 g of 1,4-BD was fed into the reactor, After all the monomer was added the reaction was held at 65° C. for an additional one half hour at which point the reactor was cooled to room temperature.

The resulting emulsion was filtered through a 100 mesh screen. This emulsion contained 28% solids and the particle size was 174.9 nm as measured by dynamic light scattering.

TABLE I

| Ex. | Continuous Phase | Monomers | Surfactant | Initiator | Reductant |
|---|---|---|---|---|---|
| 1 | EG | 2-EHA, TMPTA | Hitenol A-10 | NaPS | — |
| 2 | EG | 2-EHA, TMPTA | Hitenol A-10 | ABVA | — |
| 3 | EG | 2-EHA, TMPTA | Hitenol A-10 | t-BHP | SFS |
| 4 | EG | 2-EHA, Sty, ALMA | FES 77 | t-BHP | SFS |
| 5 | EG | 2-EHA, Vac | Hitenol HS-20 | t-BHP | SFS |
| 6 | EG | Sty, BA, ALMA | Hitenol HS-20 | t-BHP | SFS |
| 7 | EG | MMA, 2-EHA, ALMA | Hitenol HS-20 | t-BHP | SFS |
| 8 | EG | 2-EHA, Sty, ALMA | Hitenol HS-20 | t-BHP | SFS |
| 9 | EG | 2-EHA, Sty, ALMA | Hitenol HS-20 | t-BHP | IAA |
| 10 | PG/Water | 2-EHA, Sty, ALMA | Hitenol HS-20 | t-BHP | SFS |
| 11 | PG/EG | 2-EHA, Sty, ALMA | Hitenol HS-20 | t-BHP | SFS |
| 12 | DEG/Water | 2-EHA, Sty, ALMA | Hitenol HS-20 | t-BHP | SFS |
| 13 | DEG/EG | 2-EHA, Sty, ALMA | Hitenol HS-20 | t-BHP | SFS |
| 14 | TPG/Water | 2-EHA, Sty, ALMA | Hitenol HS-20 | t-BHP | SFS |
| 15 | EG/Water | 2-EHA, Sty | FES 77 | t-BHP | SFS |
| 16 | CHDM/Water | 2 EHA, Sty | Hitenol HS-20 | t-BHP | SFS |
| 17 | CHDM/EG | 2-EHA, Sty | Hitenol HS-20 | t-BHP | SFS |
| 18 | NPG/Water | 2-EHA, Sty, MAA | Hitenol HS-20 | t-BHP | SFS |
| 19 | EG/Water | 2-EHA, Sty | Tergitol 15-S-40 | t-BHP | SFS |
| 20 | EG | Sty, isoprene, MAA | Hitenol HS-20 | t-BHP | SFS |
| 21 | 1,4BD/Water | 2-EHA, Sty, MAA | Hitenol HS-20 | t-BHP | SFS |

Examples Relating to Modified Condensation Polymers Prepared Using Non-Core Shell Type Latex Polymers Example 22
(Comparative Example)

PET homopolymer was prepared by the following procedure. Dimethyl terephthalate (0.5 moles, 97 grams), ethylene diol (1.0 moles, 62 grams) and catalyst metal were placed in a 0.5 L polymerization reactor under a 1 atmosphere nitrogen atmosphere. The mixture was heated with stirring at 200° C. for 1 hour and then 210° C. for 3 hours. The temperature was increased to 280° C., the nitrogen flow was stopped and vacuum applied. The polymer was stirred under vacuum (0.2–0.3 Torr) for 1 hour. The polymer was allowed to cool and ground. After grinding, some of the polymer was utilized to melt press polymer films that could be used for physical property testing. The characterization data is listed in Table 2.

Example 23

The blend was prepared by the following procedure. Dimethyl terephthalate (0.5 moles, 97 grams), ethylene diol (10 moles, 62 grams) and catalyst metal were placed in a 0.5 L polymerization reactor under a nitrogen atmosphere. The mixture was heated with stirring at 200° C. for 1 hour and then 210° C. for 3 hours. The temperature was increased to 275° C. and held there for 30 minutes. Nitrogen flow was stopped and vacuum was applied (5 Torr) for five minutes. After this time the temperature of the polymerization was decreased to 240° C. and pressure was increased to 300 Torr. 1 mL of the emulsion of Example 1 was syringed into the polymerization flask which dispersed into the polymer melt. The temperature was increased to 275° C. and pressure dropped to 10 Torr. After five minutes, the pressure was increased to 300 Torr and an additional 2 mL Example 1 emulsion was added. Vacuum was increased to 0.2–0.3 Torr for 45 minutes at a stir rate decreasing from 200 to 50 rpms. The melt appeared homogeneous but with some opacity. Heating and stirring were removed and the blend crystallized to a white opaque solid in 15 minutes. The polymer was allowed to cool and ground. After grinding, some of the polymer was utilized to melt press polymer films that could be used for physical property testing. The characterization data is listed in Table 2. Transmission Electron Microscopy of a melt pressed film showed that the rubber particles were dispersed in a polyester matrix. Particle sizes ranged from 50–300 nm.

Example 24

The blend was prepared by the following procedure. Dimethyl terephthalate (0.5 moles, 97 grams), ethylene diol (1.0 moles, 52 grams) and catalyst metal were placed in a 0.5 L polymerization reactor under a nitrogen atmosphere. The mixture was heated with stirring at 200° C. for 1 hour and then 210° C. for 3 hours. The temperature was increased to 280° C. and held there for 20 minutes. Nitrogen flow was stopped and vacuum was applied (5 Torr) for five minutes. Pressure was increased to 300 Torr. 10 mL of the emulsion of Example 1 was syringed into the polymerization flask that dispersed into the polymer melt. Vacuum was increased to 0.2–0.3 Torr for 60 minutes at a stir rate decreasing from 200 to 50 rpms. The melt appeared homogeneous but with some opacity. Heating and stirring were removed and the blend crystallized to a white opaque solid in 30 minutes. The polymer was allowed to cool and ground. After grinding, some of the polymer was utilized to melt press polymer films that could be used for testing. The characterization data is listed in Table 2. Transmission Electron Microscopy of a melt pressed film showed that the rubber particles were dispersed in a polyester matrix. Particle sizes were from 100–400 nm.

TABLE 2

Properties of impact modified PET using acrylate emulsions in EG.

| | PET | | 1% Acrylate | | 3.5% Acrylate | |
|---|---|---|---|---|---|---|
| Properties | Polymer | Film | Polymer | Film | Polymer | Film |
| Ih V. (dl/g) | 0.61 | 0.58 | 0.64 | 0.60 | 0.73 | 0.67 |
| $Tch_1$ | none | 142 | None | 1334 | none | 135 |
| $Tm_1$ | 254 | 257 | 250 | 251 | 239 | 238 |
| | ($H_f$ = 12.82) | ($H_f$ = 10.79) | ($H_f$ = 11.56) | ($H_f$ = 9.08) | ($H_f$ = 8.40) | ($H_f$ = 7.31) |

TABLE 2-continued

Properties of impact modified PET using acrylate emulsions in EG.

| | PET | | 1% Acrylate | | 3.5% Acrylate | |
|---|---|---|---|---|---|---|
| Properties | Polymer | Film | Polymer | Film | Polymer | Film |
| $T_g$ | 81 | 78 | 78 | 77 | 73 | 72 |
| $Tch_2$ | 152 | 137 | 161 | 149 | 162 | 150 |
| $Tm_2$ | 257 | 257 | 252 | 251 | 240 | 240 |
| | ($H_f$ = 9.89) | ($H_f$ = 12.70) | ($H_f$ = 10.20) | ($H_f$ = 10.92) | ($H_f$ = 7.97) | ($H_f$ = 9.61) |
| Tcc | 161 | 193 | 158 | 178 | none | 154 |
| Film % Xtal | NT | 7.84 | NT | 5.6 | NT | 2.68 |
| $M_n$ | 12300 | 11600 | 12800 | 11800 | 13600 | 13000 |
| $M_w$ | 39900 | 35900 | 40300 | 37500 | 49200 | 46400 |
| $M_z$ | 67000 | 59800 | 64500 | 60600 | 81000 | 76400 |
| Film Impact (ft-lbs) | NT | 2.36 | NT | 2.60 | NT | 2.74 |
| Failure Mode | B B | brittle | B B | ductile | B B | Ductile |

NT = not tested

Example 25

To a 1 L jacketed reaction kettle equipped with a condenser, nitrogen purge, and stirrer, 394.63 g of water and 2.31 g of Hitenol HS-20 were added. The contents of the reactor were heated to 65° C. In a separate 500 ml flask, a monomer/surfactant mix of 196.15 g butylacrylate, 23.08 g of styrene, 11.54 g of allyl methacrylate 58.85 g of water and 4.62 g of Hitenol HS-20 was prepared. To the heated reactor, 29.4 g of the monomer/surfactant mix was added. After allowing the contents of the reactor to re-equilibrate, 0.77 g of t-butyl hydroperoxide (t-BHP) dissolved in 11.2 g of distilled water was added to the reactor followed by 0.23 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 195 minutes. During the same time period, 0.92 g of SFS dissolved in 28 g of distilled water was fed into the reactor. Also, 0.51 g of 90 wt. % t-BHP dissolved in 56 g of water was fed into the reactor. After all the monomer was added the reaction was held at 65° C. for an additional one half hour at which point the reactor was cooled to room temperature.

The resulting emulsion was filtered through a 100 mesh screen. This emulsion contained 28.5% solids and the particle size was 63 nm as measured by dynamic light scattering.

Example 26

The blend was prepared by the following procedure. Dimethyl terephthalate (0.5 moles, 97.0 grams), ethylene diol (1.0 moles, 62.0 grams), 15.0 grams of the emulsion of Example 25, and catalyst metal were placed in a 0.5 L polymerization reactor under a 1 atmosphere nitrogen atmosphere. The mixture was heated with stirring under a slow nitrogen purge at 200° C. for 1 hour and then 2 hours at 210° C. The temperature was increased to 275° C., the nitrogen flow was stopped and vacuum applied. The polymer was stirred under vacuum (0.1–0.3 Toff) for 60 minutes and then stirring was stopped and heat removed. The polymer was allowed to cool and ground. The Ih.V. was 0.50 dL/g, the Mw was 32,200 grams/mole, the Tg was 86.0° C.

Example 27

To a 1 L jacketed reaction kettle equipped with a condenser, nitrogen purge, and stirrer, 395.93 g of ethylene diol (EG) and 7.90 g of Hitenol HS-20 were added. The contents of the reactor were heated to 65° C. In a separate 500 ml flask, a monomer/surfactant mix of 182.88 g 2-ethylhexylacrylate, 31.61 g of styrene, 11.29 g of allyl methacrylate, 57.57 g of EG and 4.52 g of Hitenol HS-20 was prepared. To the heated reactor, 28.79 g of the monomer/surfactant mix was added. After allowing the contents of the reactor to re-equilibrate, 0.50 g of 90% t-butyl hydroperoxide (t-BHP) dissolved in 11.2 g of EG was added to the reactor followed by 0.23 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 195 minutes. During the same time period, 0.68 g of SFS dissolved in 28 g of distilled water was fed into the reactor. Also, 0.50 g of 90 wt. % t-BHP dissolved in 56 g of EG was fed into the reactor. After all the monomer was added the reaction was held at 65° C. for an additional one half hour at which point the reactor was cooled to room temperature.

The resulting emulsion was filtered through a 100 mesh screen. This emulsion contained 28.4% solids and the particle size was 120 nm as measured by dynamic light scattering.

Example 28

The blend was prepared by the following procedure. Diphenyl carbonate (0.30 moles, 64.20 grams), bisphenol A (0.30 moles, 68.40 grams, and catalyst metal were placed in a 0.5 L polymerization reactor under a 1 atmosphere nitrogen atmosphere. The mixture was heated with stirring under a slow nitrogen purge at 200° C. for 0.5 hour, 220° C. for 20 minutes, 24° C. for 30 minutes, 260° C. for 30 minutes, and the temperature was raised to 280° C. At this point 13.4 grams of the emulsion of Example 27 was slowly added via a 125 mL pressure-equalizing funnel over a period of 2 minutes and continued heating at 280° C. under an atmosphere of nitrogen. Over a period of 15 minutes the pressure in the flask was reduced from 1 atmosphere to 0.35 Torr with the application of vacuum. The temperature was increased to 290° C. for 30 minutes, to 300° C. for 1.5 hours and then 320° C. for 20 minutes. Heat and stirring were removed from the viscous melt and the polymer was allowed to cool. The Tg was 135° C. and Ih.V. was 0.29 dL/g. Particles up to 30 microns in size are dispersed in the polycarbonate matrix (optical microscopy).

Example 29

To a 1 L jacketed reaction kettle equipped with a condenser, nitrogen purge, and stirrer, 395.33 g of ethylene diol and 5.50 g of Hitenol HS-20 were added. The contents of the reactor were heated to 65° C. In a separate 500 ml flask, a monomer/surfactant mix of 194.84 g 2-ethylhexylacrylate, 22.92 g of styrene, 11.46 g of allyl methacrylate, 47.89 g of ethylene diol and 3.44 g Hitenol HS-20 was prepared. To the heated reactor, 29.1 g of the monomer/surfactant mix was added. After allowing the contents of the reactor to re-equilibrate, 0.51 g of 90 wt. % t-butyl hydroperoxide (t-BHP) dissolved in 11.2 g of ethylene diol was added to the reactor followed by 0.23 g Sodium formaldehyde sulfoxylate (SFS) dissolved in 11.2 g of distilledwater. After a few minutes, the reactor appearance changed from clear to a bluish-white tint indicating the formation of small particles. The remaining monomer mix was fed into the reactor over a period of 195 minutes. During the same time period, 0.68 g of SFS dissolved in 28 g of distilled water was fed into the reactor. Also, 0.51 g of 90 wt. % t-BHP dissolved in 56 g of ethylene diol was fed into the reactor. After all the monomer was added, the reaction was held at 65° C. for an additional one half hour at which point the reactor was cooled to room temperature.

The resulting emulsion was filtered through a 100-mesh screen. The emulsion contained 27.5% solids and the particle size was 164 nm as measured by dynamic light scattering.

Example 30

The blend was prepared by the following procedure. Dimethyl terephthalate (0.5 moles, 97.0 grams), 1,4-cyclohexanedimethanol (0.75 moles, 108 grams), and catalyst metal were placed in a 0.5 L polymerization reactor under a 1 atmosphere nitrogen atmosphere. The mixture was heated with stirring under a slow nitrogen purge at 310° C. for 10 minutes and the solution was homogeneous. 30 grams of the emulsion of Example 29 and 1.5 mL of the antifoaming agent DC-7 (Dow Coming) were added over a 15 minute period and the reaction was heated under an atmosphere of nitrogen for 45 more minutes. At this point vacuum was added and the pressure was lowered to 200 Torr and then (within a minute) the pressure was decreased to 0.3–0.5 Torr and stirred for 1 hour giving a viscous polymer solution. Heat was removed and the polymer was allowed to cool and then ground. The Ih.V. was 0.65 dL/g, the Tg was 91.4° C. ($2^{nd}$ cycle) and the Tm was 274.4° C. ($2^{nd}$ cycle).

Example 31

The polymer was prepared by the following procedure. Dimethyl terephthalate (0.5 moles, 97.0 grams), 1,4-butanediol (0.75 moles, 67.5 grams), and catalyst metal were placed in a 0.5 L polymerization reactor under a 1 atmosphere nitrogen atmosphere. The mixture was heated with stirring under a slow nitrogen purge at 200° C. for 1 hour, at 210° C. for 2 hours and then the temperature was increased to 255° C. and held for 15 minutes. At this point vacuum was added and the pressure was lowered to 200 Torr and then (within a minute) the pressure was decreased to 0.3–0.5 Torr and stirred for 1 hour giving a viscous polymer solution. Heat was removed and the polymer was allowed to cool and then ground. The Ih.V. was 0.94 dL/g, the Tg was 45.6° C. ($_2$nd cycle) and the Tm was 224.0° C. ($_2$nd cycle). Mn was 13,000 and Mw was 35,400.

Example 32

The blend was prepared by the following procedure. Dimethyl terephthalate (0.5 moles, 97.0 grams), 1,4-butanediol (0.75 moles, 67.5 grams), and catalyst metal were placed in a 0.5 L polymerization reactor under a 1 atmosphere nitrogen atmosphere. The mixture was heated with stirring under a slow nitrogen purge at 200° C. for about fifteen minutes and then 30 mL of emulsion of Example 29 was added to the reaction vessel over a 2 minute period. The reaction mixture was heated for another 45 minutes at 200° C. and then 210° C. for 2 hours. The temperature was raised to 255° C. and held for fifteen minutes before vacuum (200 Torr) was applied and then (within a minute) the pressure was decreased to 0.3–0.5 Torr and stirred for 1 hour giving a viscous polymer melt. Heat was removed and the polymer was allowed to cool and then ground. The Ih.V. was 0.58 dL/g, the Tg was 42.3° C. ($2^{nd}$ cycle) and the Tm was 178.8° C. ($2^{nd}$ cycle).

Example 33

The blend was prepared by the following procedure. Dimethyl terephthalate (0.5 moles, 97.0 grams), ethylene diol (1.0 moles, 62.0 grams), and catalyst metal were placed in a 0.5 L polymerization reactor under a 1 atmosphere nitrogen atmosphere. The mixture was heated with stirring under a slow nitrogen purge at 200° C. for about 10 minutes until the mixture was homogeneous. Over a 20 minute period, 56.5 grams of the emulsion of Example 27 was added with a 125 mL pressure-equalizing funnel and the reaction was heated for 45 minutes longer at 200° C., for two hours at 210° C. and then raised to 280° C. At this point vacuum was added and the pressure was lowered to from 1 atmosphere 0.3–0.5 Torr over the period of 35 minutes. Pressure of 0.3–0.5 Torr was maintained for 45 minutes as the viscous melt was stirred. Heat was removed and the polymer was allowed to cool and then ground. A tough (tan-colored) translucent film was melt-pressed at 200° C. for 15 seconds. The Ih.V. was 0.59 dL/g, the Tg was 28° C. ($2^{nd}$ cycle). Particles up to 30 microns in size were dispersed in the polyester matrix. (optical microscopy)

Example 34

To a 1 L jacketed reaction kettle equipped with a condenser, nitrogen purge, and stirrer, 406.17 g of a ethylene diol (EG) water solution and 4.58 g of Hitenol HS-20 were added. The contents of the reactor were heated to 65° C. In a separate 500 ml flask, a monomer/surfactant mix of 206.11 g of styrene, 22.90 g of divinyl benzene, 68.70 g of EG and 4.58 g of Hitenol HS-20 was prepared. To the heated reactor, 30.23 g of the monomer/surfactant mix was added. After allowing the contents of the reactor to re-equilibrate, 0.51 g of 90% t-butyl hydroperoxide (t-BHP) dissolved in 11.45 g of EG was added to the reactor followed by 0.23 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 195 minutes. During the same time period, 0.69 g of SFS dissolved in 28 g of distilled water was fed into the reactor. Also, 0.51 g of 90 wt. % t-BHP dissolved in 34.35 g of EG was fed into the reactor. After all the monomer was added the reaction was held at 65° C. for an additional one half hour at which point the reactor was cooled to room temperature.

The resulting emulsion was filtered through a 100 mesh screen. This emulsion contained 28.0% solids and the particle size was 174 nm as measured by dynamic light scattering.

Example 35

The blend was prepared by the following procedure. Dimethyl terephthalate (0.5 moles, 97.0 grams), ethylene diol (1.0 moles, 62.0 grams), and catalyst metal were placed in a 0.5 L polymerization reactor under a 1 atmosphere nitrogen atmosphere. The mixture was heated with stirring under a slow nitrogen purge at 200° C. for 1 hour and then 210° C. for two hours. Over a 17 minute period, 56.5 grams of the emulsion of Example 34 was added with a 125 mL pressure-equalizing funnel and then the reaction mixture was raised to 280° C. At this point vacuum was added and the pressure was lowered to from 1 atmosphere to 0.3–0.5 Torr over a period of 11 minutes. Pressure of 0.3–0.5 Torr was maintained for 1 hour as the viscous melt was stirred. Heat was removed and the polymer was allowed to cool and then ground. A tough film was melt-pressed at 280° C. for 15 seconds. The Ih.V. was 0.54 dL/g, the Tg was 57° C. ($2^{nd}$ cycle), the Tm was 200° C. ($2^{nd}$ cycle). Optical microscopy showed that the particles were somewhat agglomerated and up to about 30 microns in size.

Example 36

To a 1 L jacketed reaction kettle equipped with a condenser, nitrogen purge, and stirrer, 406.17 g of a ethylene diol (EG) water solution and 4.58 g of Hitenol HS-20 were added. The contents of the reactor were heated to 65° C. In a separate 500 ml flask, a monomer/surfactant mix of 183.21 g of 2-ethylhexylacrylate, 18.32 g of styrene, 27.48 g of trimetylolpropane triacrylate, 68.70 g of EG and 4.58 g of Hitenol HS-20 was prepared. To the heated reactor, 30.23 g of the monomer/surfactant mix was added. After allowing the contents of the reactor to re-equilibrate, 0.51 g of 90% t-butyl hydroperoxide (t-BHP) dissolved in 11.45 g of EG was added to the reactor followed by 0.23 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 195 minutes. During the same time period, 0.69 g of SFS dissolved in 28 g of distilled water was fed into the reactor. Also, 0.51 g of 90 wt. % t-BHP dissolved in 34.35 g of EG was fed into the reactor. After all the monomer was added the reaction was held at 65° C. for an additional one half hour at which point the reactor was cooled to room temperature.

The resulting emulsion was filtered through a 100 mesh screen.

Example 37

The blend was prepared by the following procedure. Dimethyl terephthalate (0.5 moles, 97.0 grams), ethylene diol (1.0 moles, 62.0 grams), and catalyst metal were placed in a 0.5 L polymerization reactor under a 1 atmosphere nitrogen atmosphere. The mixture was heated with stirring under a slow nitrogen purge at 200° C. for 1 hour and then 210° C. for two hours. Over a 21 minute period, 56.5 grams of the emulsion of Example 36 was added with a 125 mL pressure-equalizing funnel and then the reaction mixture was raised to 280° C. At this point vacuum was added and the pressure was lowered to from 1 atmosphere to 0.3–0.5 Torr over a period of 11 minutes. Pressure of 0.3–0.5 Torr was maintained for 1 hour as the viscous melt was stirred. Heat was removed and the polymer was allowed to cool and then ground. A tough film was melt-pressed at 280° C. for 15 seconds. The Ih.V. was 0.66 dL/g, the Tg was 51° C. ($2^{nd}$ cycle), the Tm was 200° C. ($2^{nd}$ cycle). Optical microscopy showed that the particles were somewhat agglomerated and up to about 30 microns in size.

Example 38

To a 1 L jacketed reaction kettle equipped with a condenser, nitrogen purge, and stirrer, 338.86 g of 1,4-butanediol (1,4-BD), 127.56 g of distilled water and 7.90 g of Hitenol HS-20 were added. The contents of the reactor were heated to 65° C. In a separate 500 ml flask, a monomer/surfactant mix of 191.91 g of 2-ethylhexylacrylate, 22.58 g of styrene, 11.29 g of allyl methacrylate, and 4.52 g of Hitenol HS-20 was prepared. To the heated reactor, 23.03 g of the monomer/surfactant mix was added. After allowing the contents of the reactor to re-equilibrate, 0.65 g of 70% t-butyl hydroperoxide (t-BHP) dissolved in 9.03 g of 1,4-BD was added to the reactor followed by 0.23 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 195 minutes. During the same time period, 0.68 g of SFS dissolved in 28 g of distilled water was fed into the reactor. Also, 0.65 g of 70 wt. % t-BHP dissolved in 45.16 g of 1,4-BD was fed into the reactor. After all the monomer was added the reaction was held at 65° C. for an additional one half hour at which point the reactor was cooled to room temperature.

The resulting emulsion was filtered through a 100 mesh screen. Particle size of the resulting latex was measured to be 175 nm by dynamic light scattering.

Example 39

The blend was prepared by the following procedure. Dimethyl terephthalate (0.40 moles, 77.6 grams), 1,4-butanediol (0.60 moles, 54.0 grams), and catalyst metal were placed in a 0.5 L polymerization reactor under a 1 atmosphere nitrogen atmosphere. The mixture was heated with stirring under a slow nitrogen purge at 200° C. for 1 hour and then 210 C for one hour. Over a 36 minute period, 51.8 grams of the emulsion of Example 38 were added with a 125 mL pressure-equalizing funnel and then the reaction mixture was raised to 255° C. At this point vacuum was added and the pressure was lowered to from 1 atmosphere to 0.3–0.5 Torr over a period of 10 minutes. Pressure of 0.3–0.5 Torr was maintained for 1 hour as the viscous melt was stirred. Heat was removed and the polymer was allowed to cool and then ground. A very tough film was melt-pressed at 260° C. for 15 seconds. The Ih.V. was 0.58 dL/g, the Tg was 25° C. ($2^{nd}$ cycle), the Tm was 220° C. ($2^{nd}$ cycle). Optical microscopy showed that the particles were somewhat agglomerated and up to about 30 microns in size.

Example 40

To a 1 L jacketed reaction kettle equipped with a condenser, nitrogen purge, and stirrer, 395.38 g of a 60 wt. percent Neopentyl diol (NPG) water solution and 5.70 g of Hitenol HS-20 were added. The contents of the reactor were heated to 65° C. In a separate 500 ml flask, a monomer/surfactant mix of 186.89 g 2-ethylhexylacrylate, 27.35 g of styrene, 6.84 g of allyl methacrylate, 6.84 g of methacrylic acid, 58.12 g of the 60 wt. percent NPG/Water solution and 4.56 g of Hitenol HS-20 was prepared. To the heated reactor, 29.1 g of the monomer/surfactant mix was added. After allowing the contents of the reactor to re-equilibrate, 0.51 g of t-butyl hydroperoxide (t-BHP) dissolved in 11 g of 60% NPG/Water solution was added to the reactor followed by 0.0.23 g Sodium formaldehyde sulfoxylate (SFS) dissolved in 11.2 g of distilledwater. After a few minutes, the reactor appearance changed from clear to white with a bluish-white tint indicating the formation of small particles. The remaining monomer mix was fed into the reactor over a period of 195 minutes. During the same time period, 0.68 g of SFS dissolved in 28 g of distilled water was fed into the reactor. Also, 0.51 g of 90 wt. % t-BHP dissolved in 56 g of 60% NPG/Water solution was fed into the reactor. After all the monomer was added the reaction was held at 65° C. for an additional one half hour at which point the reactor was cooled to room temperature.

The resulting emulsion was filtered through a 100 mesh screen. The particle size of the resulting latex was bimodal with sizes of 691 nm and 211 nm as measured by dynamic light scattering.

Example 41

In a 2 L reaction kettle equipped with steam jacketed condenser, a water cooled condenser and a Dean-Stark trap was placed 496 g of neopentyldiol (NPG), 86 g of trimethylolpropane (TMP) and 460 g of isophthalic acid (IPA). To this was added 250 g of the NPG containing latex Example 40. The reaction was heated to 150° C. After reaching 150° C., 1.5 g of Fastcat 4100 (Sn Catalyst) was added. After 1 hour, the temperature was increased to 220° C. and held at this temperature for 3 hours. A total of 140 ml of water was collected in the distillate. The reactor was then cooled to 120° C. and 477 g of 1,4-cyclohexane dicarboxylic acid (1,4-CHDA) was added and the temperature was increased to 230° C. The reaction was held at 230° C. for 2 and one-half hours and then cooled. A total of 241 ml of water was collected over the entire reaction period (88% of theoretical amount). 325 g of xylene was then added to the resin. The resin retained the hazy nature of the latex. No signs of coagulated acrylic rubber were observed.

Enamels were prepared from the latex-containing polyester resin and Resimene 745 (hexamethoxymethyl melamine). Resin/crosslinker weight ratio was 70/30. 0.3% pTSA was used as catalyst and 0.4% FC430 was used as a flow aid. Coatings were drawn down on Bonderite 1000 panels using a wire wound bar. Panels were baked at 160° C. for 30 minutes. Coating had over 500 MEK double rubs indicating good cure.

Example 42

To a 1 L jacketed reaction kettle equipped with a condenser, nitrogen purge, and stirrer, 341.88 g of a ethylene diol and 37.99 g of 15 wt. % Rhodafac RE-610 (phosphate surfactant from Rhone Poulenc) were added. The contents of the reactor were heated to 65° C. In a separate 500 ml flask, a monomer/surfactant mix of 182.34 g 2-ethylhexylacrylate, 27.35 g of styrene, 18.23 g of glycidyl methacrylate, 30.39 g of Rhodafac RE-610 and 45.58 g of ethylene diol was prepared. To the heated reactor, 30.39 g of the monomer/surfactant mix was added. After allowing the contents of the reactor to re-equilibrate, 0.51 g of t-butyl hydroperoxide (t-BHP) dissolved in 11 g of ethylene diol was added to the reactor followed by 0.23 g Sodium formaldehyde sulfoxylate (SFS) dissolved in 11.2 g of distilledwater. After a few minutes, the reactor appearance changed from grayish white to white with a slight bluish tint indicating the formation of particles. The remaining monomer mix was fed into the reactor over a period of 215 minutes. During the same time period, 0.68 g of SFS dissolved in 28 g of distilled water was fed into the reactor. Also, 0.65 g of 70 wt. % t-BHP dissolved in 45.6 g of EG was fed into the reactor. After all the monomer was added, the reaction was held at 65° C. for an additional one half hour at which point the reactor was cooled to room temperature. The resulting emulsion was filtered through a 100 mesh screen.

Example 43

Emulsion Polymer/Polyurethane Hybrid

A urethane/acrylic composite was prepared by the following procedure. To a 50 ml flask was added 14.61 g of methylenebis(4-cyclohexyl isocyanate) and 5.75 g of latex of Example 42. A catalyst dibutyltindiacetate (0.1 g) was added to the mixture. Within 1 hour, the reaction exothermed and formed a stiff polymer foam containing the latex.

Example 44

To a 1 L jacketed reaction kettle equipped with a condenser, nitrogen purge, and stirrer, 395.93 g of a ethylene diol and 7.90 g of Hitenol HS-20 were added. The contents of the reactor were heated to 65° C. In separate 500 ml flask, a monomer/surfactant mix of 180.62 g 2-ethylhexylacrylate, 22.58 g of styrene, 11.29 g of allyl methacrylate, 11.29 g of methacrylic acid, 4.52 g of Hitenol HS-20 and 57.57 g of ethylene diol was prepared. To the heated reactor, 28.79 g of the monomer/surfactant mix was added. After allowing the contents of the reactor to re-equilibrate, 0.50 g of a 90 wt. % t-butyl hydroperoxide (t-BHP) dissolved in 11.2 g of ethylene diol was added to the reactor followed by 0.23 g Sodium formaldehyde sulfoxylate (SFS) dissolved in 11.2 g of distilledwater. After a few minutes, the reactor appearance from grayish white to white with a slight bluish tint indicating the formation of particles. The remaining monomer mix was fed into the rector over a period of 195 minutes. During the same time period, 0.65 g of SFS dissolved in 28 g of distilled water was fed into the reactor. Also, 0.50 g of 90 wt. % t-BHP dissolved in 56 g of EG was fed into the reactor. After all the monomer was added, the reaction was held at 65° C. for an additional one half hour at which point the reactor was cooled to room temperature.

The resulting emulsion was filtered through a 100 mesh screen. The particle size of the emulsion was 100 nm as measured by dynamic light scattering.

Example 45

A blend was prepared by the following procedure. Dimethyl terephthalate (0.32 moles, 61.9 grams), 56.5 grams of the latex of Example 44 and catalyst metal were placed in a 0.5 L polymerization reactor under a 1 atmosphere nitrogen atmosphere. The mixture was heated with stirring under a slow nitrogen purge at 200° C. for 1 hour and then 210° C. for two hours. At this point, the reaction mixture was raised to 280° C. and then vacuum was applied and the pressure was lowered from 1 atmosphere to 0.2–0.5 Torr over a period of 11 minutes. Pressure of 0.3–0.5 Torr was maintained for 1 hour as the viscous melt stirred. Heat was removed and the polymer was allowed to cool and then ground. The Ih.V. of the polymer was 0.35 dL/g.

Example 46

To a 2 L jacketed reaction kettle equipped with a condenser, nitrogen purge, and stirrer, 515.76 g of ethylene diol, 164.80 g of water and 12.28 g of 70 wt. % Tergitol 15-S-40 (Non-ionic surfactant from Union Carbide) solution were added. The contents of the reactor were heated to 85°

C. In a separate 1500 ml flask, a monomer/surfactant mix of 325.65 g 2-ethylhexylacrylate, 17.19 g of trimethylopropane-triacrylate, 7.37 g of the 70% Tergitol 15-S-40 and 103.2 g of ethylene diol was prepared. To the heated reactor, 45.44 g of the monomer/surfactant mix was added. After allowing the contents of the reactor to re-equilibrate, 0.69 g of sodium persulfate dissolved in 17 g of water was added to the reactor. After a few minutes, the reactor appearance changed from clear to a bluish-white tint indicating the formation of small particles. The remaining monomer mix was fed into the reactor over a period of 90 minutes. At the same time the monomer was being added to the reactor, 1.72 g of sodium persulfate dissolved in 34 g of water was fed into the reactor. After all the monomer was added, the reaction was held at 85° C. for an additional hour at which point the reactors was cooled to room temperature.

The resulting latex was filtered through a 100 mesh screen. The effective diameter as measured by dynamic light scattering was 194 nm.

Example 47

The blend was prepared by the following procedure. Dimethyl terephthalate (0.5 moles, 97.0 grams), ethylene glycol (1.0 moles, 62.0 grams), and catalyst metal were placed in a 0.5 L polymerization reactor under a 1 atmosphere nitrogen atmosphere. The mixture was heated with stirring under a slow nitrogen purge at 200° C. for 1 hour and then 210° C. for two hours. The temperature was increased to 280° C. and then nitrogen was shut off and vacuum applied. After 10 minutes of vacuum (0.35 Torr achieved), the vacuum was removed, nitrogen was bled in to increase the pressure to atmospheric pressure and 56.5 grams of the latex of Example 46 was added with a 125 mL pressure-equalizing funnel over a 20 minute period. Again, nitrogen flow was shut off and vacuum applied. Pressure of 0.3–0.5 Torr was maintained for 1 hour as the viscous melt was stirred. Heat was removed and the polymer was allowed to cool and then ground. A tough opaque white film was melt-pressed at 240° C. for 15 seconds. The Ih.V. was 0.80 dL/g, the Tg was 61.3° C. (2nd cycle), the Tm was 212.3° C. (2nd cycle), TEM showed that the rubber particles were 0.2–0.9 microns in size in the polyester matrix.

Example 48

To a 2 L jacketed reaction kettle equipped with a condenser, nitrogen purge, and stirrer, 656.7 g of ethylene diol and 26.86 g of Disponil FES 77 (anionic surfactant from Henkel) were added. The contents of the reactor were heated to 85° C. In a separate 1500 ml flask, a monomer/surfactant mix of 326.7 g 2-ethylhexylacrylate, 17.19 g of trimethylopropane-triacrylate, 103.2 g of ethylene diol and 16.12 g of Disponil FES 77 was prepared. To the heated reactor, 46.3 g of the monomer/surfactant mix was added. After allowing the contents of the reactor to re-equilibrate, 0.69 g of sodium persulfate dissolved in 16.8 g of water was added to the reactor. After a few minutes, the reactor appearance changed from clear to a bluish-white tint indicating the formation of small particles. The remaining monomer mix was fed into the reactor over a period of 90 minutes. At the same time the monomer was being added to the reactor, 1.72 g of sodium persulfate dissolved in 33.6 g of water was fed into the reactor. After all the monomer was added, the reaction was held at 85° C. for an additional hour at which point the reactor was cooled to room temperature.

The resulting latex was filtered through a 100 mesh screen. The effective diameter as measured by dynamic light scattering was 155 nm.

Example 49

The blend was prepared by the following procedure. Dimethyl terephthalate (0.5 moles, 97.0 grams), ethylene glycol (1.0 mole, 62.0 grams), and catalyst metal were placed in a 0.5 L polymerization reactor under a 1 atmosphere nitrogen atmosphere. The mixture was heated with stirring under a slow nitrogen purge at 200° C. for 1 hour and then 210° C. for two hours. The temperature was increased to 280° C. and then nitrogen was shut off and vacuum applied. After 10 minutes of vacuum (0.35 Torr achieved), the vacuum was removed, nitrogen was bled in to increase the pressure to atmospheric pressure and 56.6 grams of the latex from Example 48 was added with a 125 mL pressure-equalizing funnel over a 10 minute period. Again, nitrogen flow was shut off and a vacuum applied. Pressure of 0.3–0.5 Torr was maintained for 1 hour as the viscous melt was stirred. Heat was removed and the polymer was allowed to cool and then ground. A tough opaque white film was melt-pressed at 240° C. for 15 seconds. The Ih.V. was 0.82 dL/g, the Tg was 60.1° C. (2nd cycle), the Tm was 212.2° C. (2nd cycle). TEM showed that the rubber particles were 0.2–0.9 microns in size in the polyester matrix.

Examples Relating to Diol Latexes and Modified Condensation Polymers Prepared U.S. Pat. No. ing Core Shell Type Latex Polymers Example 50

To a 1 L jacketed reaction kettle equipped with a condenser, nitrogen purge, and stirrer, 412.8 g of ethylene glycol (EG), 4.57 g of Hitenol HS-20 (Anionic surfactant from DKS International) were added. The contents of the reactor were heated to 65° C. In a separate 500 ml flask, a monomer/surfactant mix of 91.43 g of 2-ethylhexylacrylate, 17.14 g of styrene, 5.71 g of divinyl benzene, 2.28 g of Hitenol HS-20 and 22.86 g of EG was prepared. To the heated reactor, 13.9 g of the monomer/surfactant mix was added. After allowing the contents of the reactor to re-equilibrate, 0.65 g of 70% t-butyl hydroperoxide (t-BHP) dissolved in 11.4 g of 1,4-BD was added to the reactor followed by 0.46 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 80 minutes. After this monomer feed was finished, a second monomer feed containing 22.86 g of 2-ethylhexylacrylate, 85.71 g of styrene, 5.71 g of divinyl benzene, 2.28 g of Hitenol HS-20 and 22.86 g of EG was fed in over the next 80 minute time period. During the entire time period, 0.68 g of SFS dissolved in 39.2 g of distilled water was fed into the reactor. Also, 0.98 g of 70 wt. % t-BHP dissolved in 38.9 g of EG was fed into the reactor. After all the monomer was added the reaction was held at 65° C. for an additional one half hour at which point the reactor was cooled to room temperature. The latex obtained was filtered through 100 mesh screen. The particle size of the latex was measured by dynamic light scattering and was found to have a volume average particle size of 221 nm. This latex contained 30 percent solid material and the particles were core/shell with a core theoretical glass transition temperature of −36° C. and a shell theoretical glass transition temperature of 53° C.

Example 51

The blend was prepared by the following procedure. Dimethyl terephthalate (0.5 moles, 97 grams), ethylene diol (10 moles, 62 grams), and catalyst metal were placed in a 0.5 L polymerization reactor under a nitrogen atmosphere. The mixture was heated with stirring at 200° C. for 1 hour, during which 56.5 grams of the latex described in Example 50 were added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground.

Example 52

To a 1 L jacketed reaction kettle equipped with a condenser, nitrogen purge, and stirrer, 412.8 g of ethylene glycol (EG), 4.57 g of Hitenol HS-20 (Anionic surfactant from DKS International) were added. The contents of the reactor were heated to 65° C. In a separate 500 ml flask, a monomer/surfactant mix of 17.14 g of 2-ethylhexylacrylate, 91.43 g of styrene, 5.71 g of divinyl benzene, 2.28 g of Hitenol HS-20 and 22.86 g of EG was prepared. To the heated reactor, 13.9 g of the monomer/surfactant mix was added. After allowing the contents of the reactor to re-equilibrate, 0.65 g of 70% t-butyl hydroperoxide (t-BHP) dissolved in 11.4 g of 1,4-BD was added to the reactor followed by 0.46 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 80 minutes. After this monomer feed was finished, a second monomer feed containing 91.43 g of 2-ethylhexylacrylate, 17.14 g of styrene, 5.71 g of divinyl benzene, 2.28 g of Hitenol HS-20 and 22.86 g of EG was fed in over the next 80 minute time period. During the entire time period, 0.68 g of SFS dissolved in 39.2 g of distilled water was fed into the reactor. Also, 0.98 g of 70 wt. % t-BHP dissolved in 38.9 g of EG was fed into the reactor. After all the monomer was added the reaction was held at 65° C. for an additional one half hour at which point the reactor was cooled to room temperature. The latex obtained was filtered through 100 mesh screen. The particle size of the latex was measured by dynamic light scattering and was found to have a volume average particle size of 158 nm. This latex contained 30 percent solid material and the particles were core/shell with a core theoretical glass transition temperature of 64° C. and a shell theoretical glass transition temperature of –37° C.

Example 53

The blend was prepared by the following procedure. Dimethyl terephthalate (0.5 moles, 97 grams), ethylene diol (10 moles, 62 grams), and catalyst metal were placed in a 0.5 L polymerization reactor under a nitrogen atmosphere. The mixture was heated with stirring at 200° C. for 1 hour during which 56.5 grams of the latex described in Example 52 was added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground. The Ih.V. was 0.54 dL/g

Example 54

To a 1 L jacketed reaction kettle equipped with a condenser, nitrogen purge, and stirrer, 412.8 g of ethylene glycol (EG), 4.57 g of Hitenol HS-20 (Anionic surfactant from DKS International) were added. The contents of the reactor were heated to 65° C. In a separate 500 ml flask, a monomer/surfactant mix of 91.43 g of n-butylacrylate, 17.14 g of styrene, 5.71 g of divinyl benzene, 2.28 g of Hitenol HS-20 and 22.86 g of EG was prepared. To the heated reactor, 13.9 g of the monomer/surfactant mix was added. After allowing the contents of the reactor to re-equilibrate, 0.65 g of 70% t-butyl hydroperoxide (t-BHP) dissolved in 11.4 g of 1,4-BD was added to the reactor followed by 0.46 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 80 minutes. After this monomer feed was finished, a second monomer feed containing 22.86 g of butylacrylate, 85.71 g of styrene, 5.71 g of divinyl benzene, 2.28 g of Hitenol HS-20 and 22.86 g of EG was fed in over the next 80 minute time period. During the entire time period, 0.68 g of SFS dissolved in 39.2 g of distilled water was fed into the reactor. Also, 0.98 g of 70 wt. % t-BHP dissolved in 38.9 g of EG was fed into the reactor. After all the monomer was added the reaction was held at 65° C. for an additional one half hour at which point the reactor was cooled to room temperature. The latex obtained was filtered through 100 mesh screen. The particle size of the latex was measured by dynamic light scattering and was found to have a volume average particle size of 281.3 nm. This latex contained 30 percent solid material and the particles were core/shell with a core theoretical glass transition temperature of –25° C. and a shell theoretical glass transition temperature of 58.4° C.

Example 55

The blend was prepared by the following procedure. Dimethyl terephthalate (0.5 moles, 97 grams), ethylene diol (10 moles, 62 grams), and catalyst metal were placed in a 0.5 L polymerization reactor under a nitrogen atmosphere. The mixture was heated with stirring at 200° C. for 1 hour, during which 56.5 grams of the latex described in Example 54 was added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground.

Example 56

To a 1 L jacketed reaction kettle equipped with a condenser, nitrogen purge, and stirrer, 385.14 g of ethylene glycol (EG), 18.29 g of ABEX 22S (Anionic surfactant, 25% solids in water, from Rhone-Poulenc) were added. The contents of the reactor were heated to 65° C. In a separate 500 ml flask, a monomer/surfactant mix of 91.43 g of 2-ethylhexylacrylate, 17.14 g of styrene, 5.71 g of divinyl benzene, 9.14 g of ABEX 22S and 22.86 g of EG was prepared. To the heated reactor, 14.6 g of the monomer/surfactant mix was added. After allowing the contents of the reactor to re-equilibrate, 0.65 g of 70% t-butyl hydroperoxide (t-BHP) dissolved in 11.4 g of 1,4-BD was added to the reactor followed by 0.46 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 80 minutes. After this monomer feed was finished, a second monomer feed containing 22.86 g of 2-ethylhexylacrylate, 85.71 g of styrene, 5.71 g of divinyl benzene, 9.14 g ABEX 22S and 22.86 g of EG was fed in over the next 80 minute time period. During the entire time period, 0.68 g of SFS dissolved in 39.2 g of distilled water was fed into the reactor. Also, 0.98 g of 70 wt. % t-BHP dissolved in 38.9 g of EG was fed into the reactor. After all the monomer was added the reaction was held at 65° C. for an additional one half hour at which point the reactor was cooled to room temperature. The latex obtained was filtered through 100 mesh screen. The particle size of the latex was measured by dynamic light scattering and was found to have a volume average particle size of 135 nm. This latex contained 30 percent solid material and the particles were core/shell with a core theoretical glass transition temperature of −36° C. and a shell theoretical glass transition temperature of 53° C.

Example 57

The blend was prepared by the following procedure. Dimethyl terephthalate (0.5 moles, 97 grams), ethylene diol (10 moles, 62 grams), and catalyst metal were placed in a 0.5 L polymerization reactor under a nitrogen atmosphere. The mixture was heated with stirring at 200° C. for 1 hour, during which 56.5 grams of the latex described in Example 57 was added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground. The Ih.V. was 0.53 dL/g, Tm=258° C.

Example 58

To a 1 L jacketed reaction kettle equipped with a condenser, nitrogen purge, and stirrer, 385.14 g of ethylene glycol (EG), 18.29 g of ABEX 22S (Anionic surfactant, 25% solids in water, from Rhone-Poulenc) were added. The contents of the reactor were heated to 65° C. In a separate 500 ml flask, a monomer/surfactant mix of 17.14 g of 2-ethylhexylacrylate, 91.43 g of styrene, 5.71 g of divinyl benzene, 9.14 g of ABEX 22S and 22.86 g of EG was prepared. To the heated reactor, 14.6 g of the monomer/surfactant mix was added. After allowing the contents of the reactor to re-equilibrate, 0.65 g of 70% t-butyl hydroperoxide (t-BHP) dissolved in 11.4 g of 1,4-BD was added to the reactor followed by 0.46 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 80 minutes. After this monomer feed was finished, a second monomer feed containing 91.43 g of 2-ethylhexylacrylate, 17.14 g of styrene, 5.71 g of divinyl benzene, 9.14 g ABEX 22S and 22.86 g of EG was fed in over the next 80 minute time period. During the entire time period, 0.68 g of SFS dissolved in 39.2 g of distilled water was fed into the reactor. Also, 0.98 g of 70 wt. % t-BHP dissolved in 38.9 g of EG was fed into the reactor. After all the monomer was added the reaction was held at 65° C. for an additional one half hour at which point the reactor was cooled to room temperature. The latex obtained was filtered through 100 mesh screen. The particle size of the latex was measured by dynamic light scattering and was found to have a volume average particle size of 148 nm. This latex contained 30 percent solid material and the particles were core/shell with a core theoretical glass transition temperature of 64° C. and a shell theoretical glass transition temperature of −36° C.

Example 59

The blend was prepared by the following procedure. Dimethyl terephthalate (0.5 moles, 97 grams), ethylene diol (10 moles, 62 grams), and catalyst metal were placed in a 0.5 L polymerization reactor under a nitrogen atmosphere. The mixture was heated with stirring at 200° C. for 1 hour, during which 56.5 grams of the latex described in Example 58 was added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground.

Example 60

To a 1 L jacketed reaction kettle equipped with a condenser, nitrogen purge, and stirrer, 385.14 g of ethylene glycol (EG), 18.29 g of ABEX 22S (Anionic surfactant, 25% solids in water, from Rhone-Poulenc) were added. The contents of the reactor were heated to 65° C. In a separate 500 ml flask, a monomer/surfactant mix of 137.14 g of 2-ethylhexylacrylate, 25.71 g of styrene, 8.57 g of divinyl benzene, 9.14 g of ABEX 22S and 22.86 g of EG was prepared. To the heated reactor, 14.24 g of the monomer/surfactant mix was added. After allowing the contents of the reactor to re-equilibrate, 0.65 g of 70% t-butyl hydroperoxide (t-BHP) dissolved in 11.4 g of 1,4-BD was added to the reactor followed by 0.46 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 20 minutes. After this monomer feed was finished, a second monomer feed containing 11.43 g of 2-ethylhexylacrylate, 40.00 g of styrene, 2.86 g of divinyl benzene, 2.86 g of 2-hydroxyehtyl methacrylate, 9.14 g ABEX 22S and 22.86 g of EG was fed in over the next 40 minute time period. During the entire time period, 0.69 g of SFS dissolved in 39.2 g of distilled water was fed into the reactor. Also, 0.98 g of 70 wt. % t-BHP dissolved in 38.9 g of EG was fed into the reactor. After all the monomer was added the reaction was held at 65° C. for an additional one half hour at which point the reactor was cooled to room temperature. The latex obtained was filtered through 100 mesh screen. The particle size of the latex was measured by dynamic light scattering and was found to have a volume average particle size of 135 nm. This latex contained 30 percent solid material and the particles were core/shell with a core theoretical glass transition temperature of-36° C. and a shell theoretical glass transition temperature of 53° C.

Example 61

The blend was prepared by the following procedure. Dimethyl terephthalate (0.5 moles, 97 grams), ethylene diol (10 moles, 62 grams), and catalyst metal were placed in a 0.5 L polymerization reactor under a nitrogen atmosphere. The mixture was heated with stirring at 200° C. for 1 hour, during which 56.5 grams of the latex described in Example 60 was added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground.

Example 62

To a 1 L jacketed reaction kettle equipped with a condenser, nitrogen purge, and stirrer, 385.14 g of ethylene glycol (EG), 18.29 g of ABEX 22S (Anionic surfactant, 25% solids in water, from Rhone-Poulenc) were added. The contents of the reactor were heated to 65° C. In a separate 500 ml flask, a monomer/surfactant mix of 91.43 g of 2-ethylhexylacrylate, 17.14 g of styrene, 5.71 g of divinyl benzene, 9.14 g of ABEX 22S and 22.86 g of EG was prepared. To the heated reactor, 14.6 g of the monomer/surfactant mix was added. After allowing the contents of the reactor to re-equilibrate, 0.65 g of 70% t-butyl hydroperoxide (t-BHP) dissolved in 11.4 g of 1,4-BD was added to the reactor followed by 0.46 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 80 minutes. After this monomer feed was finished, a second monomer feed containing 22.86 g of 2-ethylhexylacrylate, 85.71 g of methylmethacrylate, 5.71 g of divinyl benzene, 9.14 g ABEX 22S and 22.86 g of EG was fed in over the next 80 minute time period. During the entire time period, 0.68 g of SFS dissolved in 39.2 g of distilled water was fed into the reactor. Also, 0.98 g of 70 wt. % t-BHP dissolved in 38.9 g of EG was fed into the reactor. After all the monomer was added the reaction was held at 65° C. for an additional one half hour at which point the reactor was cooled to room temperature. The latex obtained was filtered through 100 mesh screen. The particle size of the latex was measured by dynamic light scattering and was found to have a volume average particle size of 144 nm. This latex contained 30 percent solid material and the particles were core/shell with a core theoretical glass transition temperature of –36° C. and a shell theoretical glass transition temperature of 60.9° C.

Example 63

The blend was prepared by the following procedure. Dimethyl terephthalate (0.5 moles, 97 grams), ethylene diol (10 moles, 62 grams), and catalyst metal were placed in a 0.5 L polymerization reactor under a nitrogen atmosphere. The mixture was heated with stirring at 200° C. for 1 hour, during which 56.5 grams of the latex described in Example 62 was added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground. The Ih.V. was 0.56 dL/g, Tm=257° C.

Example 64

To a 1 L jacketed reaction kettle equipped with a condenser, nitrogen purge, and stirrer, 385.14 g of ethylene glycol (EG), 18.29 g of ABEX 22S (Anionic surfactant, 30 25% solids in water, from Rhone-Poulenc) were added. The contents of the reactor were heated to 65° C. In a separate 500 ml flask, a monomer/surfactant mix of 91.43 g of 2-ethylhexylacrylate, 17.14 g of styrene, 5.71 g of trimethylolpropane triacrylate, 9.14 g of ABEX 22S and 22.86 g of EG was prepared. To the heated reactor, 14.6 g of the monomer/surfactant mix was added. After allowing the contents of the reactor to re-equilibrate, 0.65 g of 70% t-butyl hydroperoxide (t-BHP) dissolved in 11.4 g of 1,4-BD was added to the reactor followed by 0.46 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 80 minutes. After this monomer feed was finished, a second monomer feed containing 22.86 g of 2-ethylhexylacrylate, 85.71 g of styrene, 5.71 g of trimethyolpropane triacrylate, 9.14 g ABEX 22S and 22.86 g of EG was fed in over the next 80 minute time period. During the entire time period, 0.68 g of SFS dissolved in 39.2 g of distilled water was fed into the reactor. Also, 0.98 g of 70 wt. % t-BHP dissolved in 38.9 g of EG was fed into the reactor. After all the monomer was added the reaction was held at 65° C. for an additional one half hour at which point the reactor was cooled to room temperature. The latex obtained was filtered through 100 mesh screen. The particle size of the latex was measured by dynamic light scattering and was found to have a volume average particle size of 136 nm. This latex contained 30 percent solid material and the particles were core/shell with a core theoretical glass transition temperature of –36° C. and a shell theoretical glass transition temperature of 55° C.

Example 65

The blend was prepared by the following procedure. Dimethyl terephthalate (0.5 moles, 97 grams), ethylene diol (10 moles, 62 grams), and catalyst metal were placed in a 0.5 L polymerization reactor under a nitrogen atmosphere. The mixture was heated with stirring at 200° C. for 1 hour, during which 56.5 grams of the latex described in Example 64 was added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground.

Example 66

To a 1 L jacketed reaction kettle equipped with a condenser, nitrogen purge, and stirrer, 385.14 g of ethylene glycol (EG), 18.29 g of ABEX 22S (Anionic surfactant, 25% solids in water, from Rhone-Poulenc) were added. The contents of the reactor were heated to 65° C. In a separate 500 ml flask, a monomer/surfactant mix of 137.14 g of 2-ethylhexylacrylate, 25.71 g of styrene, 8,57 g of trimethyolpropane triacrylate, 9.14 g of ABEX 22S and 22.86 g of EG was prepared. To the heated reactor, 14.2 g of the monomer/surfactant mix was added. After allowing the contents of the reactor to re-equilibrate, 0.65 g of 70% t-butyl hydroperoxide (t-BHP) dissolved in 11.4 g of 1,4-BD was added to the reactor followed by 0.46 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 120 minutes. After this monomer feed was finished, a second monomer feed containing 11.43 g of 2-ethylhexylacrylate, 42.86 g of styrene, 2.86 g of trimethylolpropane triacrylate, 9.14 g ABEX 22S and 22.86 g of EG was fed in over the next 40 minute time period. During the entire time period, 0.68 g of SFS dissolved in 39.2 g of distilled water was fed into the reactor. Also, 0.98 g of 70 wt. % t-BHP dissolved in 38.9 g of EG was fed into the reactor. After all the monomer was added the reaction was held at 65° C. for an additional one half hour at which point the reactor was cooled to room temperature. The latex obtained was filtered through 100 mesh screen. The particle size of the latex was measured by dynamic light scattering and was found to have a volume average particle size of 135 nm. This latex contained 30 percent solid material and the particles were core/shell with a core theoretical glass transition temperature of −36° C. and a shell theoretical glass transition temperature of 55° C.

Example 67

The blend was prepared by the following procedure. Dimethyl terephthalate (0.5 moles, 97 grams), ethylene diol (10 moles, 62 grams), and catalyst metal were placed in a 0.5 L polymerization reactor under a nitrogen atmosphere. The mixture was heated with stirring at 200° C. for 1 hour, during which 56.5 grams of the latex described in Example 66 was added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground.

Examples Relating to Modified Condensation Polymers Prepared Utilizing Glycolyzed Polyesters Example 68

To a 2 L jacketed reaction kettle equipped with a condenser, nitrogen purge, and stirrer, 515.76 g of ethylene diol, 164.79 g of water and 12.28 g of Tergitol 15-S-40, a nonionic surfactant manufactured by Union Carbide (70% in water), were added. The contents of the reactor were heated to 85° C. In a separate 500 ml flask, a monomer/surfactant mix of 326.65 g 2-ethylhexylacrylate, 17.19 g of trimethylolpropane triacrylate, 103.15 g of ethylene diol and 7.37 g of Tergitol 15-S-40 was prepared. To the heated reactor, 45.44 g of the monomer/surfactant mix was added. After allowing the contents of the reactor to re-equilibrate, 0.69 g of sodium persulfate dissolved in 16.8 g of water was added to the reactor. After a few minutes, the reactor appearance changed from clear to a bluish-white tint indicating the formation of small particles. The remaining monomer mix was fed into the reactor over a period of 90 minutes. At the same time the monomer was being added to the reactor, 1.72 g of sodium persulfate dissolved in 33.6 g of water was fed into the reactor. After all the monomer was added, the reaction was held at 85° C. for an additional hour at which point the reactor was cooled to room temperature.

The resulting latex was filtered through a 100 mesh screen. The dried scrap collected on the screen was 18.45 g.

The effective diameter as measured by dynamic light scattering was 194 nm.

Example 69

An amorphous sample of [polyethylene terephthalate (98.5)-co-1,4-cyclohexylenedimethylene terephthalate (1.5)] copolymer of Ih.V. of 0.62 dL/g (96.0 grams, 0.5 moles) and ethylene glycol (1.24 grams, 0.02 moles) were placed in a 0.5 L polymerization reactor under a 1 atmosphere nitrogen atmosphere. The reactor was immersed in a 280° C. bath with stirring. After about 15 minutes the polymer had melted to produce a homogeneous melt and the melt was sampled for Ih.V. The Ih.V. of this sample was 0.22 dL/g (control experiment). At this point 56.5 grams of the emulsion of Example 68 was slowly added via a 125 mL pressure-equalizing funnel over a period of 25 minutes and continued heating at 280° C. under an atmosphere of nitrogen. At this point, nitrogen flow was terminated and vacuum was applied. Within ten minutes, the pressure was reduced from ca. 1 atmosphere to 0.30 Torr. The polymer was stirred under vacuum (0.2–0.3 Torr) for 1 hour, achieving a high melt viscosity. The polymer was allowed to cool and ground. After grinding, some of the polymer was utilized to melt press polymer films that could be used for testing. The Tg was 54° C. and Ih.V. was 0.80 dL/g. Spherical particles up to 0.6 microns in size are dispersed in the polyester matrix (transmission electron microscopy).

Example 70

An amorphous sample of [polyethylene terephthalate (98.5)-co-1,4-cyclohexylenedimethylene terephthalate (1.5)] copolymer of Ih.V. of 0.62 dL/g (96.0 grams, 0.5 moles), ethylene glycol (0.62 grams, 0.01 moles), and sodium acetate (0.058 grams, $7.04 \times 10^{-4}$ mole) were placed in a 0.5 L polymerization reactor under a 1 atmosphere nitrogen atmosphere. The reactor was immersed in a 280° C. bath with stirring. After about 15 minutes the polymer melted to produce a homogeneous melt and the melt was sampled for Ih.V. The Ih.V. of this sample was 0.31 dL/g. At this point 56.5 grams of the emulsion of Example 68 was slowly added via a 125 mL pressure-equalizing funnel over a period of 23 minutes and continued heating at 280° C. under an atmosphere of nitrogen. At this point, nitrogen flow was terminated and vacuum was applied. Within 12 minutes, the pressure was reduced from ca. 1 atmosphere to 0.30 Torr. The polymer was stirred under vacuum (0.2–0.3 Torr) for 1 hour, achieving a high melt viscosity . The polymer was allowed to cool and ground. After grinding, some of the polymer was utilized to melt press polymer films that could be used for testing. The Tg was 61° C. and Ih.V. was 0.69 dL/g. Spherical particles up to 0.8 microns in size were dispersed in the polyester matrix (transmission electron microscopy).

Example 71

To a 2 L jacketed reaction kettle equipped with a condenser, nitrogen purge, and stirrer, 656.73 g of ethylene diol, and 26.86 g of Dispomil FES 77, a anionic surfactant manufactured by Henkel (30% in water), were added. The contents of the reactor were heated to 85° C. In a separate 500 ml flask, a monomer/surfactant mix of 326.65 g 2-ethylhexylacrylate, 17.19 g of trimethylolpropane triacrylate, 103.15 g of ethylene diol and 16.12 g of Disponil FES 77 was prepared. To the heated reactor, 45.44 g of the monomer/surfactant mix was added. After allowing the contents of the reactor to re-equilibrate, 0.69 g of sodium persulfate dissolved in 16.8 g of water was added to the reactor. After a few minutes, the reactor appearance changed from clear to a bluish-white tint indicating the formation of small particles. The remaining monomer mix was fed into the reactor over a period of 90 minutes. At the same time the monomer was being added to the reactor, 1.72 g of sodium persulfate dissolved in 33.6 g of water was fed into the reactor. After all the monomer was added, the reaction was held at 85° C. for an additional hour at which point the reactor was cooled to room temperature.

The resulting latex was filtered through a 100 mesh screen. The dried scrap collected on the screen was 2.77 g. The effective diameter as measured by dynamic light scattering was 155 nm.

Example 72

Crystalline pellets of polyethylene terephthalate having Ih.V.=0.71 dL/g (96.0 grams, 0.5 moles) and 56.5 grams of the emulsion of Example 71 were placed in a 0.5 L polymerization reactor under a 1 atmosphere nitrogen atmosphere. The reactor was immersed in a 190° C bath and slow stirring was begun. After about 60 minutes, the bath temperature was increased to 200° C. for 55 minutes, to 220° C. for 25 minutes, and to 240° C. for 25 minutes. During the time at 240° C., the polyethylene terephthalate pellets melted/reacted to produce a uniform melt having a low melt viscosity, and the stirrer speed was increased to 200 rpm. The bath temperature was increased to 280° C. during about 15 minutes, held for an additional 5 minutes, and vacuum was applied. Within about 15 minutes, the pressure was reduced from 1 atmosphere to 0.3 torr. The polymer was stirred under vacuum (0.2–0.3 Torr) for 1.4 hours, achieving a high melt viscosity. The Tg was 44° C., and the Ih.V. was 0.70 dL/g. Spherical particles up to about 10 microns in size were dispersed in the polyester matrix (optical microscopy).

Example 73

To a 2 L jacketed reaction kettle equipped with a condenser, nitrogen purge, and stirrer, 625.19 g of ethylene diol and 26.84 g of Disponil FES 77, an alkyl ethoxylate sodium sulfate, (30% active in water) manufactured by Henkel were added. The contents of the reactor were heated to 85° C. In a separate 500 ml flask, a monomer/surfactant mix of 326.34 g 2-ethylhexylacrylate, 17.18 g of trimethyolpropane triacrylate, 103.05 g of ethylene diol and 16.10 g of Disponil FE77 was prepared. To the heated reactor, 46.27 g of the monomer/surfactant mix was added. After allowing the contents of the reactor to re-equilibrate, 0.74 g of 90 wt. % t-butyl hydroperoxide (t-BHP) dissolved in 8.4 g of ethylene diol was added to the reactor followed by 0.52 g of sodium formaldehyde sulfoxylate (SFS) dissolved in 8.4 g of distilledwater. After a few minutes, the reactor appearance changed from clear to a bluish-white tint indicating the formation of small particles. The remaining monomer mix was fed into the reactor over a period of 90 minutes. During the same time period, 0.86 g of SFS dissolved in 33.6 g of distilled water was fed into the reactor. Also, 1.23 g of 70 wt. % t-BHP dissolved in 33.6 g of ethylene diol was fed into the reactor. After all the monomer was added, the reaction was held at 85° C. for an additional one half hour at which point the reactor was cooled to room temperature.

The resulting emulsion was filtered through a 100-mesh screen. The particle size was 150 nm as measured by dynamic light scattering.

Example 74

Crystalline pellets of polyethylene terephthalate having Ih.V.=0.71 dL/g (96.0 grams, 0.5 moles) and 56.5 grams of the emulsion of Example 73 were placed in a 0.5 L polymerization reactor under a 1 atmosphere nitrogen atmosphere. The reactor was immersed in a 220° C.-bath, slow stirring was begun, and the bath temperature was immediately set to 240° C. After about 20 minutes, the bath temperature had reached 240° C. and the temperature was set to 280° C. At a bath temperature of 250° C.–255° C., the polyethylene terephthalate pellets melted/reacted to produce a uniform melt having a low melt viscosity, and the stirrer speed was increased to 200 rpm. The bath temperature was held at 280° C. for about 10 minutes and vacuum was applied. Within about 15 minutes, the pressure was reduced from 1 atmosphere to 0.3 torr. The polymer was stirred under vacuum (0.2–0.3 Torr) for 1 hour, achieving a high melt viscosity. The Tg was 73° C and the Ih.V. was 0.63 dL/g. Particles up to about 50 microns in size were dispersed in the polyester matrix (optical microscopy).

Examples Relating to Modified Condensation Polymers Wherein Glass Fibers are Incorporated as Reinforcing Agents Example 75

To a 1 L jacketed reaction kettle equipped with a condenser, nitrogen purge, and stirrer, 454.83 g of ethylene glycol (EG) and 10.62 g of ABEX 22S (Rhone Poulenc, a aninic surfactant 25% in water) were added. The contents of the reactor were heated to 65° C. In a separate 500 ml flask, a monomer/surfactant mix of 193.94 g of 2-ethylhexylacrylate, 23.09 g of styrene, 11.54 g of trimethyolpropane triacrylate (TMPTA) and 2.31 g of 2-hydroxyethyl methacrylate was prepared. To the heated reactor, 23.09 g of the monomer mix was added. After allowing the contents of the reactor to re-equilibrate, 0.66 g of 70% t-butyl hydroperoxide (t-BHP) dissolved in 9.24 g of ethyleneglycol was added to the reactor followed by 0.46 g Sodium formaldehyde sulfoxylate (SFS) dissolved in 11.2 g of distilled water. After a few minutes, the reactor appearance changed from clear to white with a bluish-white tint indicating the formation of small particles. The remaining monomer mix was fed into the reactor over a period of 195 minutes. During the same time period, 0.46 g of SFS and 18.47 g ABEX 22S dissolved in 28 g of distilled water was fed into the reactor. Also, 0.66 g of 70 wt. % t-BHP dissolved in 34.63 g of ethylene glycol was fed into the reactor. After all the monomer was added the reaction was held at 65° C. for an additional one half hour at which point the reactor was cooled to room temperature.

The resulting emulsion was filtered through a 100 mesh screen. Particle size of the resulting latex was measured to be 212.6 nm by dynamic light scattering.

Example 76

The blend was prepared by the following procedure. Dimethyl terephthalate (0.5 moles, 97 grams), ethylene diol (10 moles, 62 grams), 12.8 grams glass fiber and catalyst metal were placed in a 0.5 L polymerization reactor under a nitrogen atmosphere. The mixture was heated with stirring at 200° C. for 1 hour, during which 65.0 grams of the latex described in Example 75 was added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground. The Ih.V. was 0.63 dL/g, Tm=255° C., 12% and 30% increase in film yield strength and Young's modulus respectively relative to blend without glass fiber.

Example 77

The blend was prepared by the following procedure. Dimethyl terephthalate (0.5 moles, 97 grams), ethylene diol (10 moles, 62 grams), 12.8 grams glass fiber and catalyst metal were placed in a 0.5 L polymerization reactor under a nitrogen atmosphere. The mixture was heated with stirring at 200° C. for 1 hour, during which 65.0 grams of the latex described in Example 75 was added, and then 210° C. for 1.25 hours. The temperature was increased to 280° C. over 30 minutes. Nitrogen flow was stopped and vacuum was applied over 13 minutes to 0.2–0.3 Torr and held for 55 minutes at a stir rate decreasing from 165 to 25 rpms. The melt appeared homogeneous but with some opacity. Heating and stirring were removed and the blend cooled to a white opaque solid. The polymer was removed from the reaction vessel and ground. The Ih.V. was 0.62 dL/g, Tm=257° C., 40% increase in film Young's modulus relative to blend without glass fiber.

Examples Relating to Modified Condensation Polymers of a Thermoplastic Elastic Type

Example 78
Comparative Example

Dimethyl glutarate (80.0 grams, 0.5 moles), diethylene glycol (106.0 grams, 1.00 moles), and titanium butoxide in n-butanol (100 ppm Ti) were placed in a 0.5 L polymerization reactor under a 1 atmosphere nitrogen pressure. The reactor was immersed in a 190° C. bath with stirring. After 60 minutes, the metal bath temperature was increased to 200° C., then to 210° C. for an additional 90 minutes. At this point, MerpolA dissolved in ethylene glycol/n-butanol (90 ppm phosphorus) was added to the reactor, and the metal bath temperature was increased to 250° C. After 10 minutes at 250° C., nitrogen flow was terminated and vacuum was applied. Within 12 minutes, the pressure was reduced from ca. 1 atmosphere to 0.30 Torr. The polymer was stirred under vacuum (0.2–0.3 Torr) for 1 hour, achieving a very high melt viscosity. The polymer was allowed to cool and was removed from the reactor. The polymer was amber, soft, and was somewhat sticky. The Tg was –40° C. and the Ih.V. was 1.69 dL/g.

Example 79

To a 1 L jacketed reaction kettle equipped with a condenser, nitrogen purge, and stirrer, 403.49 g of ethylene glycol, 4.57 g of Hitenol HS-20 (DKS International) were added. The contents of the reactor were heated to 65° C. In a separate 500 ml flask, a monomer/surfactant mix of 205.91 g of styrene, 11.44 g of divinylbenzene, 11.44 g of 2-hydroxyethyl methacrylate, 68.64 g of ethylene glycol and 4.58 g of Hitenol HS-20 was prepared. To the heated reactor, 30.2 g of the monomer/surfactant mix was added. After allowing the contents of the reactor to re-equilibrate, 0.654 g of 70 wt. % t-butyl hydroperoxide dissolved in 11 g of ethylene glycol and 0.458 g of sodium formaldehyde sulfoxylate (SFS) dissolved in 11 g of water was added to the reactor. After a few minutes, the reactor appearance changed from clear to a bluish-white tint indicating the formation of small particles. The remaining monomer mix was fed into the reactor over a period of 195 minutes. Over the same time period, 0.654 g of 70% t-butylhydroperoxide dissolved in 34.32 g of ethylene glycol and 0.686 g of SFS dissolved in 28 g of water was fed into the reactor. After all the monomer was added the reaction was held at 65° C. for an additional one half hour at which point the reactor was cooled to room temperature.

The resulting latex was filtered through a 100 mesh screen. The effective diameter as measured by dynamic light scattering was 340.8 nm.

Example 80

Dimethyl glutarate (40.0 grams, 0.25 moles), diethylene glycol (53.0 grams, 0.50 moles), and titanium butoxide (100 ppm Ti) were placed in a 0.5 L polymerization reactor under a 1 atmosphere nitrogen pressure. The reactor was immersed in a 190° C. bath with stirring. After 30 minutes, 36.0 grams of the emulsion of Example 79 were slowly added via a 125 mL pressure-equalizing funnel over a period of 22 minutes and continued heating at 190° C. under an atmosphere of nitrogen for 8 minutes. At this time, the metal bath temperature was increased to 200° C. for 60 minutes and to 210° C. for an additional 90 minutes. At this point, MerpolA dissolved in ethylene glycol/n-butanol (90 ppm phosphorus) was added and the metal bath temperature was increased to 250° C. After 15 minutes, nitrogen flow was terminated and vacuum was applied. Within 15 minutes, the pressure was reduced from ca. 1 atmosphere to 0.30 Torr. The polymer was stirred under vacuum (0.2–0.3 Torr) for 1 hour, achieving a very high melt viscosity. The polymer was allowed to cool and was removed from the reactor. The Tg was –40° C. and the Ih.V. was 0.80 dL/g. Photomicrographs indicated particles were agglomerated up to ~200 microns (optical microscopy).

Example 81

To a 1 L jacketed reaction kettle equipped with a condenser, nitrogen purge, and stirrer, 394.84 g of ethylene glycol, 18.36 g of Abex 22S (Rhone-Puolenc) were added. The contents of the reactor was heated to 85° C. In a separate 500 ml flask, a monomer/surfactant mix of 114.78 g of styrene, 22.96 g of 2-hydroxyethyl methacrylate, 91.82 g of methyl methacrylate, 68.87 g of ethylene glycol and 18.36 g of Abex 22S was prepared. To the heated reactor, 31.68 g of the monomer/surfactant mix was added. After allowing the contents of the reactor to re-equilibrate, 0.57 g of sodium persulfate dissolved in 11.2 g of water was added to the reactor. After a few minutes, the reactor appearance changed from clear to a bluish-white tint indicating the formation of small particles. The remaining monomer mix was fed into the reactor over a period of 195 minutes. Over the same time period, 0.69 g of sodium persulfate dissolved in 56 g of water was fed into the reactor. After all the monomer was added the reaction was held at 85° C. for an additional one half hour at which point the reactor was cooled to room temperature.

The resulting latex was filtered through a 100 mesh screen. The effective diameter as measured by dynamic light scattering was 151.2 nm.

Example 82

Dimethyl glutarate (40.0 grams, 0.25 moles), diethylene glycol (53.0 grams, 0.50 moles), and titanium butoxide (100 ppm Ti) were placed in a 0.5 L polymerization reactor under a 1 atmosphere nitrogen pressure. The reactor was immersed in a 190° C. bath with stirring. After 60 minutes, the metal bath temperature was increased to 200° C. for 60 minutes, then to 210° C. for an additional 90 minutes. At this point, MerpolA dissolved in ethylene glycol/n-butanol (90 ppm phosphorus) was added and the metal bath temperature was increased to 250° C. After 15 minutes, nitrogen flow was terminated and vacuum was applied. Within 5 minutes, the pressure was reduced from ca. 1 atmosphere to 0.50 Torr. The polymer was stirred under vacuum (0.5 Torr) for 5 minutes and the vacuum was released during 2 minutes to atmospheric pressure with nitrogen. At this point, 36.0 grams of the emulsion of Example 81 was slowly added via a 125 mL pressure-equalizing funnel over a period of 15 minutes and vacuum was reapplied at 250° C. to 0.45 torr during 8 minutes. Vacuum was continued for 1 hour, achieving a moderate melt viscosity. The polymer was allowed to cool and was removed from the reactor. The Ih.V. was 0.73 dL/g. Particles up to 0.9 microns in size were dispersed in the polyester matrix (transmission electron microscopy).

Examples Relating to the Addition of Buffers to the Compositions of the Invention Example 83

To a 2 L jacketed reaction kettle equipped with a condenser, nitrogen purge, and stirrer, 515.76 g of ethylene diol, 164.79 g of water and 12.28 g of Tergitol 15-S-40, a nonionic surfactant manufactured by Union Carbide (70% in water), were added. The contents of the reactor were heated to 85° C. In a separate 500 ml flask, a monomer/surfactant mix of 326.65 g 2-ethylhexylacrylate, 17.19 g of trimethylolpropane triacrylate, 103.15 g of ethylene diol and 7.37 g of Tergitol 15-S-40 was prepared. To the heated reactor, 45.44 g of the monomer/surfactant mix was added. After allowing the contents of the reactor to re-equilibrate, 0.69 g of sodium persulfate dissolved in 16.8 g of water was added to the reactor. After a few minutes, the reactor appearance changed from clear to a bluish-white tint indicating the formation of small particles. The remaining monomer mix was fed into the reactor over a period of 90 minutes. At the same time the monomer was being added to the reactor, 1.72 g of sodium persulfate dissolved in 33.6 g of water was fed into the reactor. After all the monomer was added, the reaction was held at 85° C. for an additional hour at which point the reactor was cooled to room temperature.

The resulting latex was filtered through a 100 mesh screen. The dried scrap collected on the screen was 18.45 g. The effective diameter as measured by dynamic light scattering was 194 nm.

Example 84
(Preparation of PET/Emulsion Blend Containing No Sodium Acetate)

Dimethyl terephthalate (97.0 grams, 0.50 mole), ethylene glycol (62.0 grams, 1.00 mole), antimony triacetate in ethylene glycol solution (220 ppm Sb), manganese diacetate in ethylene glycol solution (55 ppm Mn), cobaltous acetate in ethylene glycol solution (80 ppm Co), and titanium butoxide in n-butanol solution (20 ppm Ti) were placed in a 0.5 L polymerization reactor under a 1 atmosphere nitrogen atmosphere. The reactor was immersed in a 200° C. bath with stirring. After 60 minutes, the metal bath temperature was increased to 210° C. for 120 minutes, and Merpol A dissolved in ethylene glycol/n-butanol (90 ppm phosphorus) was added. The metal bath temperature was immediately set to 280° C. After 25 minutes, the temperature had reached 280° C. After 15 minutes, nitrogen flow was terminated and vacuum was applied. Within ten minutes, the pressure was reduced from ca. 1 atmosphere to 0.35 Torr. The polymer was stirred under vacuum (0.35 Torr) for 5 minutes, and the vacuum was released to atmospheric pressure with nitrogen. At this point, 56.5 grams of the emulsion of Example 83 was slowly added via a 125-mL, pressure-equalizing funnel over a period of 20 minutes and continued heating at 280° C. for 5 minutes under an atmosphere of nitrogen. At this point, nitrogen flow was terminated and vacuum was reapplied. Within eight minutes, the pressure was reduced from ca. 1 atmosphere to 0.35 Torr. The polymer was stirred under vacuum (0.2–0.3 Torr) for 1 hour, achieving a high melt viscosity. The polymer was allowed to cool and ground. After grinding, some of the polymer was utilized to melt press polymer films that could be used for testing. The molar ratio of ethylene glycol/diethylene glycol/triethylene glycol units in the polyester was 78.7/16.9/4.4. The Tg was 61° C. and the Ih.V. was 0.80 dL/g. Spherical particles of 0.9 microns and less in size were dispersed in the polyester matrix (transmission electron microscopy).

Example 85
(Preparation of PET/Emulsion Blend Containing 50 mole % Sodium Acetate)

Dimethyl terephthalate (97.0 grams, 0.50 mole), ethylene glycol (62.0 grams, 1.00 mole), sodium acetate (0.039 gram, $4.71 \times 10^{-4}$ mole; 50 mole % of the calculated equivalents of $SO_4^-$ contained in the latex to be added below), antimony triacetate in ethylene glycol solution (220 ppm Sb), manganese diacetate in ethylene glycol solution (55 ppm Mn), cobaltous acetate in ethylene glycol solution (80 ppm Co), and titanium butoxide in n-butanol solution (20 ppm Ti) were placed in a 0.5 L polymerization reactor under a 1 atmosphere nitrogen atmosphere. The reactor was immersed in a 200° C. bath with stirring. After 60 minutes, the metal bath temperature was increased to 210° C. for 120 minutes, and Merpol A dissolved in ethylene glycol/n-butanol (90 ppm phosphorus) was added. The metal bath temperature was immediately set to 280° C. After 25 minutes, the temperature had reached 280° C. After 10 minutes, nitrogen flow was terminated and vacuum was applied. Within ten minutes, the pressure was reduced from ca. 1 atmosphere to 0.40 Torr. The polymer was stirred under vacuum (0.40 Torr) for 6 minutes, and the vacuum was released to atmospheric pressure with nitrogen. At this point, 56.5 grams of the emulsion of Example 83 was slowly added via a 125-mL, pressure-equalizing funnel over a period of 20 minutes and continued heating at 280° C. for 5 minutes under an atmosphere of nitrogen. At this point, nitrogen flow was terminated and vacuum was reapplied. Within 10 minutes, the pressure was reduced from ca. 1 atmosphere to 0.30 Torr. The polymer was stirred under vacuum (0.2–0.3 Torr) for 65 minutes, achieving a very high melt viscosity. The polymer was allowed to cool and ground. After grinding, some of the polymer was utilized to melt press polymer films that could be used for testing. The molar ratio of ethylene glycol/ diethylene glycol/triethylene glycol units in the polyester was 88.8/10.1/1.1. The Tg was 70° C. and the Ih.V. was 0.79 dL/g. Spherical particles of 1 micron and less in size were dispersed in the polyester matrix (transmission electron microscopy).

Example 86
(Preparation of PET/Emulsion Blend Containing 75 mole % Sodium Acetate)

Example 85 was repeated using the same general procedure but with more sodium acetate: (0.058 gram, $7.07 \times 10^{-4}$ mole; 75 mole % of the calculated equivalents of $SO_4^-$ contained in the added latex). The polymer was allowed to cool and ground. After grinding, some of the polymer was utilized to melt press polymer films that could be used for testing. The molar ratio of ethylene glycol/diethylene glycol/triethylene glycol units in the polyester was 95.1/4.9/0.0. The Tg was 74° C. and the Ih.V. was 0.72 dL/g. Spherical particles of 4 microns and less in size were dispersed in the polyester matrix (transmission electron microscopy).

Example 87
(Preparation of PET/Emulsion Blend Containing 90 mole % Sodium Acetate)

Example 85 was repeated using the same general procedure but with more sodium acetate: (0.070 gram, $8.48 \times 10^{-4}$ mole; 90 mole % of the calculated equivalents of $SO_4^=$ contained in the added latex). The polymer was allowed to cool and ground. After grinding, some of the polymer was utilized to melt press polymer films that could be used for testing. The molar ratio of ethylene glycol/diethylene glycol/triethylene glycol units in the polyester was 96.4/3.6/0.0. The Tg was 76° C. and the Ih.V. was 0.70 dL/g. Spherical particles of 6 microns and less in size were dispersed in the polyester matrix (transmission electron microscopy).

Example 88
(Preparation of PET/Emulsion Blend Containing 100 mole % Sodium Acetate)

Example 85 was repeated using the same general procedure but with more sodium acetate: (0.077 gram, $9.42 \times 10^{-4}$ mole; 100 mole % of the calculated equivalents of $SO_4^=$ contained in the added latex). The polymer was allowed to cool and ground. After grinding, some of the polymer was utilized to melt press polymer films that could be used for testing. The molar ratio of ethylene glycol/diethylene glycol/triethylene glycol units in the polyester was 96.4/3.6/0.0. The Tg was 76° C. and the Ih.V. was 0.75 dL/g. Spherical particles of 10 microns and less in size were dispersed in the polyester matrix (transmission electron microscopy).

From the above examples, it can be clearly seen from the above examples that the addition of sodium acetate reduces the amount of diethylene glycol in the PET hybrids.

The invention has been described in detail with particular reference to preferred embodiments thereof, but it will be understood that variations and modifications can be effected without departing from the scope and spirit of the invention.

What is claimed is:

1. A method of making a condensation polymer/first polymer matrix comprising the steps of:
   (a) preparing a polymer colloid system comprising:
      (i) a first polymer comprising latex polymer particles comprising a residue of an ethylenically unsaturated monomer;
      (ii) a surfactant; and
      (iii) a liquid continuous phase comprising a diol component, wherein the diol component comprises from about 25 to about 100% by weight of the continuous phase, and wherein the latex polymer particles are dispersed in the continuous phase;
   (b) introducing the polymer colloid system into a glycolysis reaction medium prior to or during the glycolysis reaction wherein the glycolysis reaction medium comprises a polyester, copolyester, polyesteramide, polycarbonate or a mixture thereof;
   wherein the glycolysis reaction medium optionally comprises a diol component; and
   (c) polymerizing the fully or partially glycolyzed polyester, copolyester, polyesteramide, polycarbonate or mixture thereof, thereby providing a condensation polymer/first polymer matrix.

2. The method of claim 1, wherein the polymer colloid system is introduced into the glycolysis reaction medium at the beginning of the glycolysis reaction.

3. The method of claim 1, wherein the polymer colloid system is introduced into the glycolysis reaction medium during the glycolysis reaction.

4. The method of claim 1, wherein the polymer colloid system is introduced into the glycolysis reaction medium at the end of the glycolysis reaction.

5. The method of claim 1, wherein the first polymer comprises a residue of: a non-acid vinyl monomer of acetoacetoxy ethyl methacrylate, acetoacetoxy ethyl acrylate, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, isoprene, octyl acrylate, octyl methacrylate, iso-octyl acrylate, iso-octyl methacrylate, trimethyolpropyl triacrylate, styrene, α-methyl styrene, glycidyl methacrylate, carbodiimide methacrylate, $C_1$–$C_{18}$ alkyl crotonates, di-n-butyl maleate, α- or β-vinyl naphthalene, di-octylmaleate, allyl methacrylate, di-allyl maleate, di-allylmalonate, methyoxybutenyl methacrylate, isobornyl methacrylate, hydroxybutenyl methacrylate, hydroxyethyl (meth)acrylate, hydroxypropyl(meth)acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, butadiene, vinyl(meth) acrylates, isopropenyl(meth)acrylate, cycloaliphaticepoxy (meth)acrylates, ethylformamide, 4-vinyl-1,3-dioxolan-2-one, 2,2-dimethyl-4 vinyl-1,3-dioxolate, 3,4-di-acetoxy-1-butene, or a mixture thereof.

6. The method of claim 1, wherein the first polymer comprises 50 to 100% of: butyl acrylate, isoprene, butadiene, acrylonitrile, styrene or 2-ethyl hexyl acrylate, or a mixture thereof.

7. The method of claim 1, wherein the first polymer comprises a functional group capable of reacting with diacid, diisocyanate, diarylcarbonate, dialkylcarbonate, dihalocarbonate, or the diol component and wherein the functional group comprises epoxy, acid, hydroxyl, isocyanate, amine, amide, carbonate groups, or a mixture thereof.

8. The method of claim 1, wherein the condensation polymer/first polymer matrix is a transparent or semi-transparent material.

9. The method of claim 1, wherein the diol component is in the liquid continuous phase, and the liquid continuous phase consists essentially of the diol component.

10. The method of claim 1, wherein the diol component comprises ethylene diol, 1,3-trimethylene diol, 1,3-propylene diol, tripropylene diol, 1,4-butanediol, 1,5-pentanediol, 1,6 hexanediol, 1,7-heptanediol, 1,8-octanediol, 1,9-nonanediol, neopentyl diol, cis- or trans cyclohexanedimethanol, cis or trans 2,2,4,4-tetramethyl-1,3 cyclobutanediol, diethylene diol, or a mixture thereof.

11. The method of claim 1, wherein the condensation reaction medium comprises a diol component.

12. The method of claim 1, wherein the polymer colloid system continuous phase and the glycolysis reaction medium both comprise diol.

13. The method of claim 1, wherein the first polymer is crosslinked.

14. The method of claim 1, wherein the first polymer is uncrosslinked.

15. The method of claim 1, wherein the first polymer is a core shell polymer.

16. The method of claim 1, wherein the first polymer is a non-core shell polymer.

17. The method of claim 1, wherein glass fibers are added to the glycolysis reaction medium prior to or during the glycolysis reaction.

18. The method of claim 17, wherein the glass fibers comprise from about 10 to about 50 wt. % of the condensation polymer.

19. The method of claim 1, wherein reinforcing agents comprising carbon fibers, mica, clay, talc, wollastonite, glass fibers, or calcium carbonate are added to the glycolysis reaction medium prior to or during the glycolysis reaction.

20. The method of claim 1, wherein the polymer colloid system is introduced into the condensation reaction medium prior to initiation of the condensation reaction.

21. The method of claim 1, wherein the polymer colloid system is introduced into the condensation reaction medium during an ester exchange phase.

22. A method of making a condensation polymer/first polymer matrix comprising the steps of:
(a) preparing a polymer colloid system comprising:
(i) latex polymer particles comprising a residue of an ethylenically unsaturated monomer, wherein the latex polymer particles have a size below 1000 nm, and wherein the latex particles do not comprise a fluoropolymer;
(ii) a surfactant; and
(iii) a liquid continuous phase comprising a diol component, wherein the diol component comprises 60 to 100% by weight of the continuous phase, and wherein the latex polymer particles are dispersed in the continuous phase;
(b) introducing the polymer colloid system into a glycolysis reaction medium prior to or during the glycolysis reaction wherein the glycolysis reaction medium comprises a polyester, copolyester, polyesteramide, polycarbonate or a mixture thereof;

wherein the glycolysis reaction medium optionally comprises a diol component; and (c) polymerizing the fully or partially glycolyzed polyester, copolyester, polyesteramide, polycarbonate or mixture thereof, thereby providing a condensation polymer/first polymer matrix.

* * * * *